US005565921A

United States Patent [19]

Sasaki et al.

[11] Patent Number: 5,565,921

[45] Date of Patent: Oct. 15, 1996

[54] MOTION-ADAPTIVE IMAGE SIGNAL PROCESSING SYSTEM

[75] Inventors: Hiroshi Sasaki, Tokyo; Hiroyuki Fukuda, Sagamihara; Akira Hatakenaka, Tokyo, all of Japan

[73] Assignee: Olympus Optical Co., Ltd., Tokyo, Japan

[21] Appl. No.: 213,973

[22] Filed: Mar. 15, 1994

[30] Foreign Application Priority Data

| | | | |
|---|---|---|---|
| Mar. 16, 1993 | [JP] | Japan | 5-055916 |
| Apr. 27, 1993 | [JP] | Japan | 5-101165 |
| Dec. 27, 1993 | [JP] | Japan | 5-348886 |
| Dec. 27, 1993 | [JP] | Japan | 5-348887 |

[51] Int. Cl.$^{6}$ ........ H04N 7/36

[52] U.S. Cl. ........ 348/409; 348/412

[58] Field of Search ........ 348/401, 407, 348/409, 415, 412, 419

[56] References Cited

U.S. PATENT DOCUMENTS

| | | | |
|---|---|---|---|
| 4,837,618 | 6/1989 | Hatori et al. | 348/401 |
| 4,999,704 | 3/1991 | Ando et al. | 348/401 |
| 5,237,410 | 8/1993 | Inoue | 348/409 |

FOREIGN PATENT DOCUMENTS 3-250887 11/1991 Japan .

*Primary Examiner*—Tommy P. Chin

*Assistant Examiner*—A. Au

*Attorney, Agent, or Firm*—Frishauf, Holtz, Goodman, Langer & Chick

[57] ABSTRACT

An inter-frame predicted error signal generation unit generates an inter-frame predicted error signal for selectively performing prediction between an input image signal of the current frame and a decoded image signal of the previous frame, and between the input image signal of the current frame and the image signal of the previous frame. A coding unit selectively codes the inter-frame predicted error signal generated by the inter-frame predicted error signal generation unit and the input image signal with high-efficiency compression. A statistical amount calculation unit calculates a statistical amount of the inter-frame predicted error signal generated by the inter-frame predicted error signal generation unit. Based on the statistical amount of the inter-frame predicted error signal calculated by the statistical amount calculation unit, a discrimination unit discriminates whether or not coding by the coding unit is to be performed. A transmission unit transmits a discrimination signal indicating that coding is not to be performed when the discrimination unit discriminates that coding by the coding unit is not performed.

2 Claims, 18 Drawing Sheets

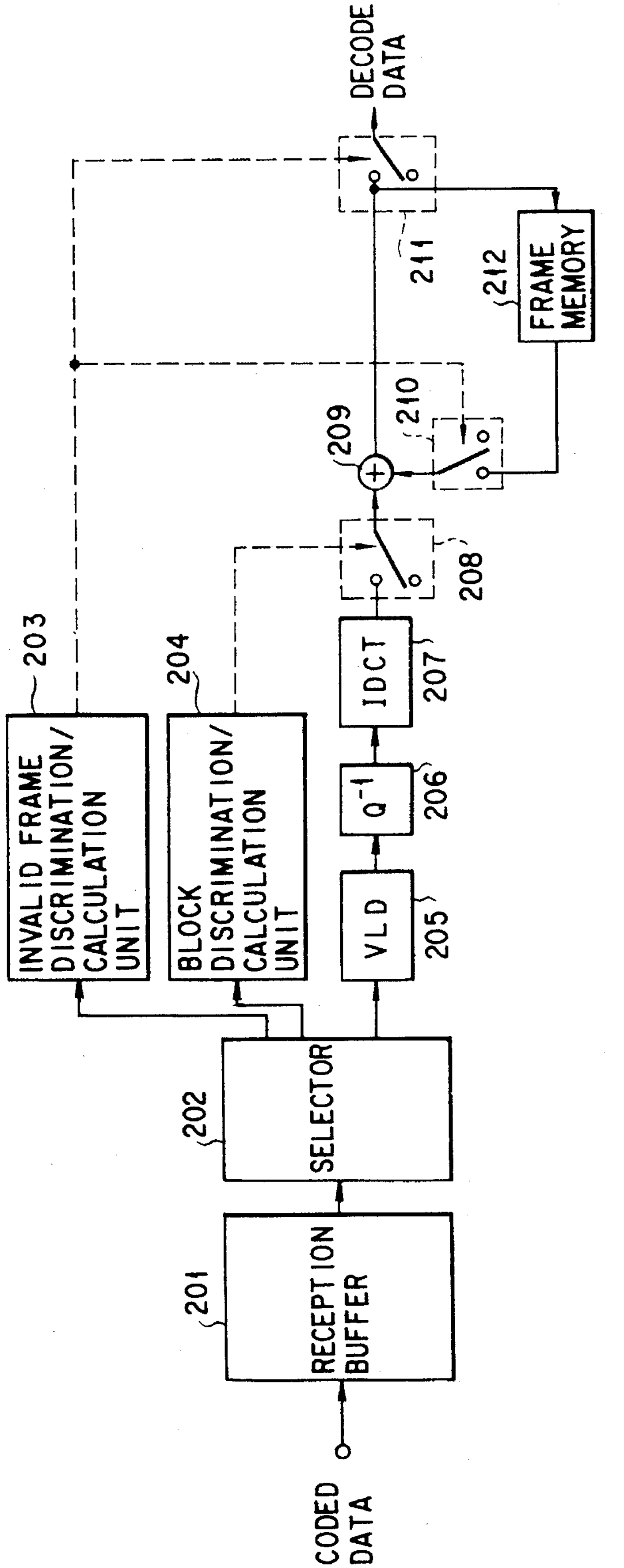
F I G. 2

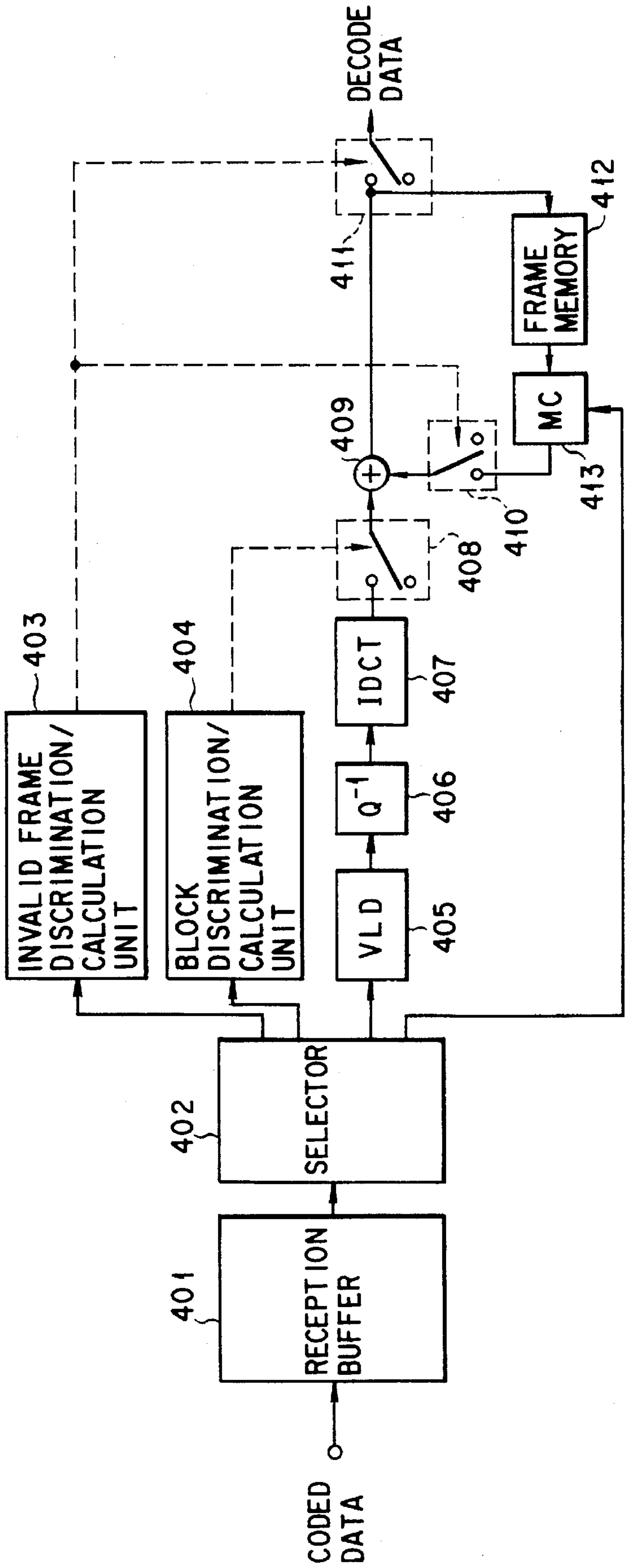
F I G. 4

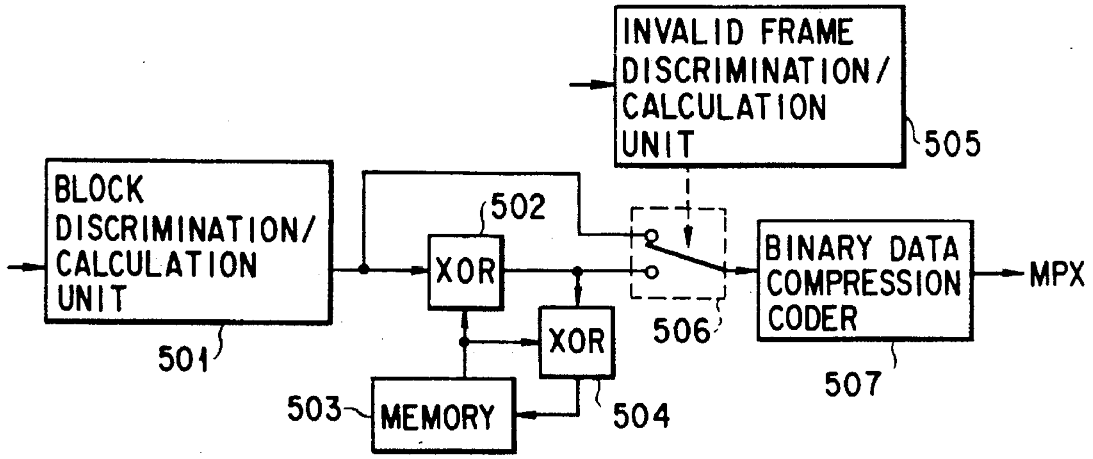
F I G. 5
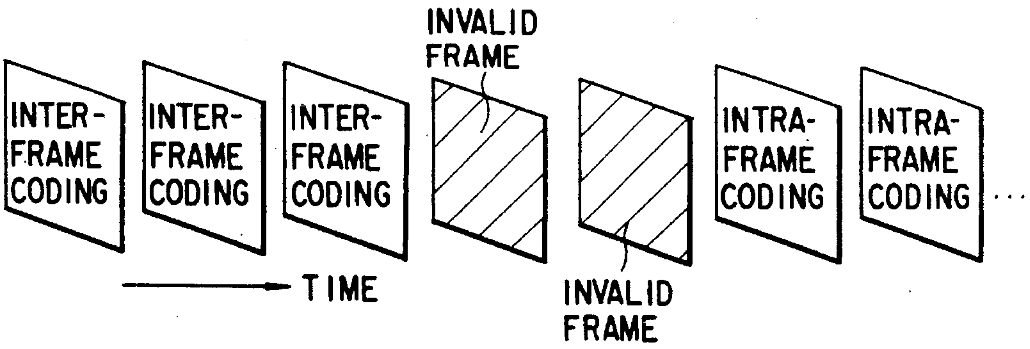
F I G. 6
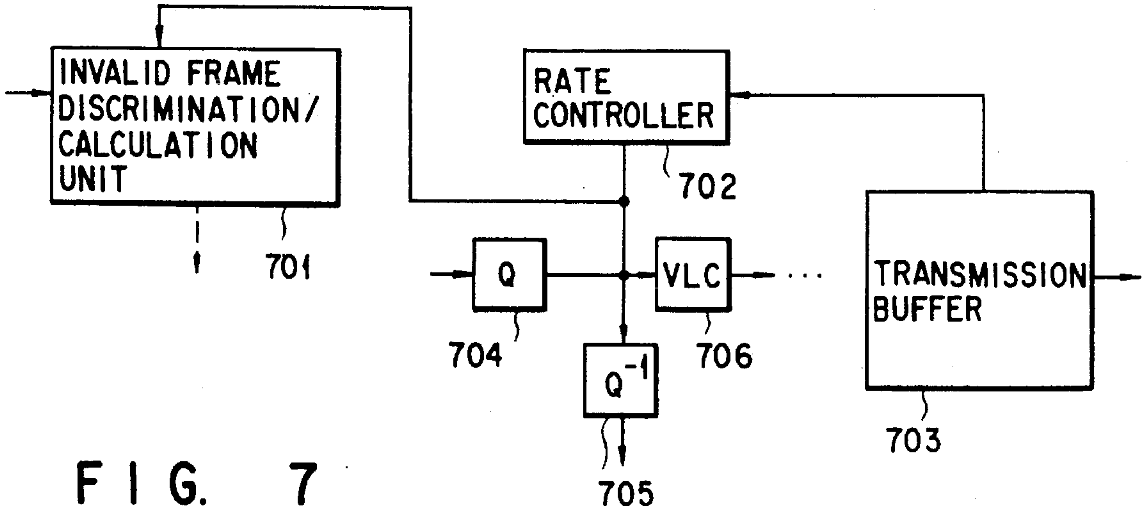
F I G. 7

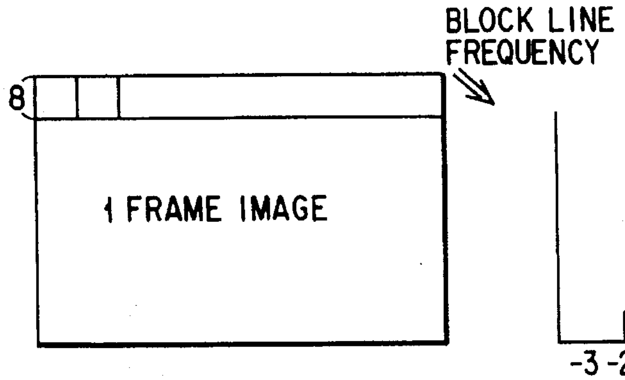
F I G. 20A
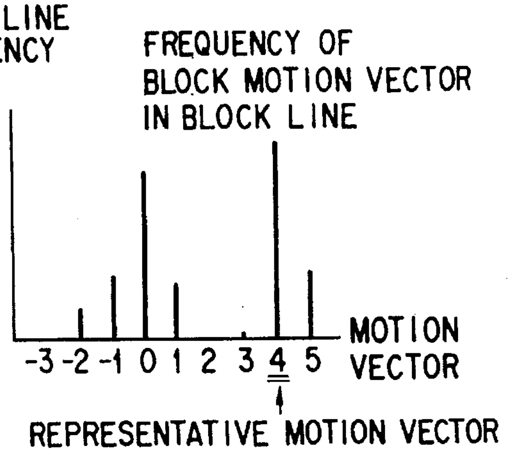
F I G. 20B
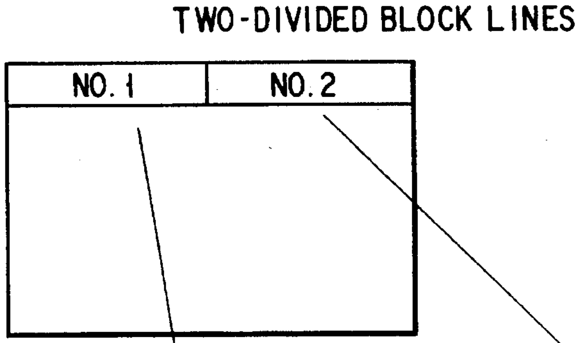
F I G. 21A
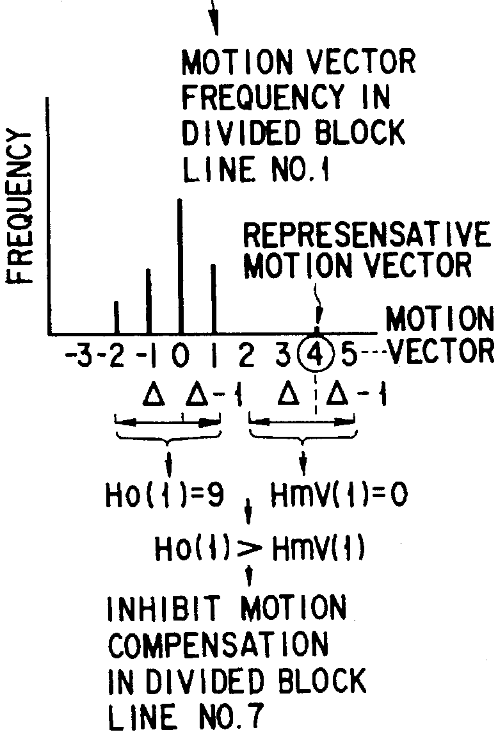
F I G. 21B
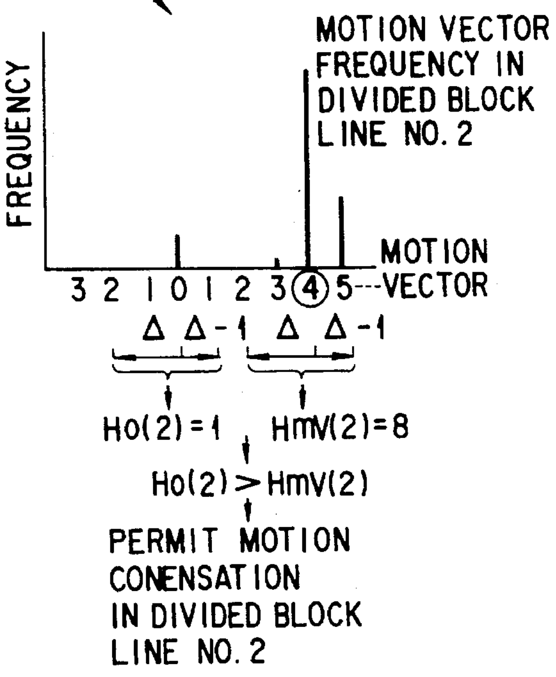
F I G. 21C

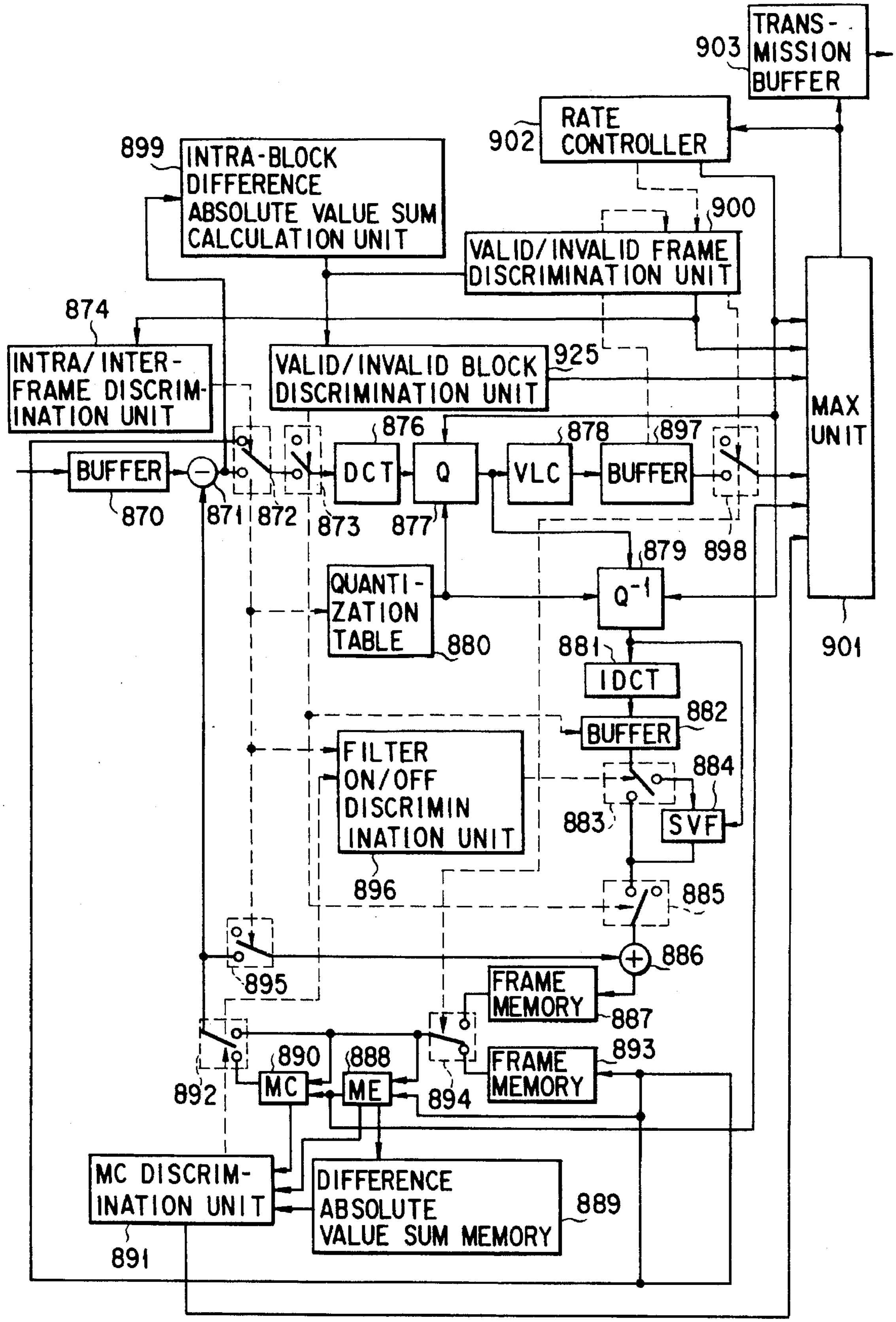
F I G. 23

MOTION-ADAPTIVE IMAGE SIGNAL PROCESSING SYSTEM

BACKGROUND OF THE INVENTION

1. Field of the Invention

The present invention generally relates to a motion-adaptive image signal processing system and, more particularly, to a motion image compression apparatus which is suitably used in compression coding of a motion image such as an ultrasonic diagnostic image whose motion region in a screen is limited in a compression coding apparatus for compressing digital motion image data.

The present invention also relates to an image signal decoding apparatus for decoding an image which is transmitted or recorded after it is subjected to high-efficiency coding.

Furthermore, the present invention relates to a motion image coding apparatus suitable for a motion image such as an ultrasonic diagnostic image whose motion region and moving direction in a screen are limited in a compression coding apparatus for compressing digital motion image data.

2. Description of the Related Art

When a motion image signal picked up by a solid-state image pickup device represented by a charge-coupled device (CCD) is recorded as digital data on a storage device such as a magnetic disk, a magnetic tape, or the like, its data amount becomes very large. For this reason, when such a motion image signal is to be recorded within a limited storage capacity range, data of the picked-up image signal must be compressed with high efficiency by some technique.

As a motion image compression method, a technique for achieving a high compression ratio by utilizing an inter-frame correlation proposed by the International Organization for Standardization (ISO) is normally used. This technique will be briefly described below with reference to FIG. 25.

FIG. 25 is a block diagram showing a conventional motion image compression technique utilizing an inter-frame correlation.

Referring to FIG. 25, a predicted error signal obtained by subtracting a motion-compensated inter-frame predicted image signal from an input image signal by a differential circuit 1 is subjected to DCT (discrete cosine transform) in units of blocks by a DCT circuit 2. Thereafter, the transformed signal is quantized by a quantization circuit 3. Furthermore, a variable length code is assigned to the quantization result by a coding circuit 4, and the coded result is recorded on a recording medium (not shown) or transmitted to an external device. The quantization result is decoded by an inverse quantization circuit 5 and an inverse DCT circuit 6, and the decoded signal is added to the motion-compensated inter-frame predicted image signal by an addition circuit 7. A motion vector is calculated by a motion-compensated prediction circuit 8 which incorporates an image memory having a motion-compensation variable delay function, thereby generating a motion-compensated inter-frame predicted image signal for the next frame.

All frames are compressed by repeating the above-mentioned series of processing operations. In this case, a difference is not always coded, but an input image signal itself is coded, and such a coded image is called an "I picture". Predicted error image signals include the following two different signals.

One predicted error signal is called a "P picture", and a difference between an image signal to be coded and an image signal of an I or P picture which is temporally located before the image signal to be coded and has already been coded is calculated. In practice, one, having higher efficiency, of a method of coding a difference from a motion-compensated predicted image signal and a so-called intra-coding method for coding a signal without calculating a difference is selected.

The other predicted error signal is called a "B picture", and one, having the highest efficiency, of methods of respectively coding three different differences from an image signal temporally located before an image signal to be coded, an image signal temporally located after the image signal to be coded, and an interpolated image signal generated from image signals temporally before and after the image signal to be coded, and intra-coding is selected. This prediction method can be switched in units of blocks, and selection information is added to a code as a block type.

In a signal which is motion-compensated to lower redundancy in the time-base direction by calculating a difference between adjacent images, DCT and variable length coding are used to lower redundancy in the space direction. A coding technique utilizing orthogonal transform such as DCT is also widely used in compression of a still image signal. This technique will be described below with reference to FIG. 26.

FIG. 26 is a diagram for explaining compression operation processing of a still image signal by a coding technique utilizing the DCT. When a signal f whose redundancy in the time-base direction is lowered is input (S101), the input image data f is divided into blocks each having a predetermined size so as to obtain data $f_b$ (S102). Two-dimensional DCT as orthogonal transform is performed in units of divided blocks, thus transforming data $f_b$ into data F (S103). Then, the transformed data F is subjected to linear quantization in accordance with frequency components (S104), and a quantized value $F_Q$ is subjected to Huffman coding as variable length coding (S105). The coded result is transmitted or recorded as compressed data C. At this time, a quantization matrix which represents relative quantization characteristics in consideration of visual characteristics with respect to the respective frequency components is prepared, and the quantization step size of the linear quantization is determined by multiplying the quantization matrix with a constant.

On the other hand, when image data is reproduced from the compressed data, the variable length code (C) is decoded to obtain the quantized value $F_Q$ of the transform coefficient (S106). However, it is impossible to obtain the true value F before quantization from this value, and a result obtained by inverse quantization is F' including an error (S107). Therefore, IDCT (inverse discrete cosine transform) is performed for this value (F') (S108), and the transformed value $f_b'$ is subjected to inverse-block processing (S109). As a result, the obtained image data f' includes an error.

Therefore, the image quality of the reproduced image f' which is reproduced and output deteriorates. More specifically, the error of the value (F') as a result of inverse quantization deteriorates image quality of the reproduced image (f') as a so-called quantization error.

This will be described in more detail below. First, input image data is divided into blocks each having a predetermined size (e.g., a block consisting of 8×8 pixels), and each divided block is subjected to two-dimensional DCT as orthogonal transform. The transform result is sequentially stored on an 8×8 matrix.

Upon observation on a two-dimensional plane, image data has a spatial frequency as frequency information based on the distribution of density information. Therefore, when the DCT is performed, image data is transformed into DC and AC components, and data indicating the value of the DC component is stored at the origin position (0, 0) on the 8×8 matrix. Then, data indicating the maximum frequency of the AC component in the abscissa direction is stored at a position (0, 7), data indicating the maximum frequency of the AC component in the ordinate direction is stored at a position (7, 0), and data indicating the maximum frequency of the AC component in the oblique direction is stored at a position (7, 7). At intermediate positions, frequency data in directions associated with their coordinate positions are stored, so that data having higher frequencies sequentially appear from the origin side.

Then, when data stored at each coordinate position on this matrix is divided by the quantization step size corresponding to each frequency component, linear quantization is performed in correspondence with the frequency components, and Huffman coding is performed as variable length coding for the quantized value. At this time, as for the DC component, a difference between itself and a DC component in a neighboring block is Huffman-coded. As for AC components, a scanning operation, called a zigzag scanning operation, is performed from a lower frequency component to a higher frequency component, and the numbers of continuous invalid components (having a value "0") (the run number of zeros) and the subsequent valid component values are two-dimensionally Huffman-coded, thus obtaining coded data.

A motion image compression method (to be referred to as inter-frame coding hereinafter) which utilizes an inter-frame correlation such as a P picture, a B picture, and the like is a very effective compression method when an inter-frame correlation is high, i.e., when the contents of images between adjacent frames undergo almost no change. However, when patterns significantly change (contents of images are switched) between adjacent frames like in a scene change, compression efficiency is impaired due to an increase in inter-frame error.

Jpn. Pat. Appln. KOKAI Publication No. 3-250887 discloses a countermeasure against a scene change upon execution of inter-frame coding. More specifically, a scene change is detected on the basis of an inter-frame difference, and upon detection of the scene change, a compression method (to be referred to as intra-frame coding hereinafter) which utilizes only an intra-frame correlation like the I picture is executed, thus preventing coding efficiency from being impaired.

However, when coding is performed at a predetermined rate, if intra-frame coding is performed every time a scene change occurs, since the code amount generated by intra-frame coding is normally considerably larger than that generated by inter-frame coding to be executed other than a scene change, a code amount which can be used in inter-frame coding after intra-frame coding is limited to a very small amount.

This means a considerably high compression ratio in a frame to be subjected to inter-frame coding after intra-frame coding executed upon detection of a scene change. As a result, the quantization step size becomes large, and a quantization error causes deterioration of image quality such as the above-mentioned block distortion. Furthermore, since the subsequent inter-frame coded frames use the image, whose image quality has deteriorated, as a reference image, deterioration of image quality continues over several frames.

In this technique, the compression ratio is normally controlled by changing the quantization step size of the quantization. As the compression ratio increases, the quantization step size becomes larger. Therefore, the quantization error becomes large, and deterioration of image quality of a reproduced image becomes conspicuous.

The quantization error of the transform coefficient tends to appear as a so-called block distortion (discontinuity generated at a block boundary portion in a reproduced image) or mosquito noise (a fog-like pattern appearing on a flat portion near an edge). Since these distortions are visually conspicuous, subjective impression of the reproduced image given to a person who observes the image is bad even when the S/N ratio is good.

Thus, a technique for filtering an image reproduced by a decoder using a low-pass filter as distortion removal processing has been proposed. This filtering technique can relatively satisfactorily remove a distortion. However, when an image includes an edge, the edge is blurred. Conversely, when the degree of low-pass filtering is lowered to eliminate blurring, the block distortion cannot be perfectly removed.

In order to eliminate this drawback, a technique for detecting the presence/absence of an edge and a distortion in an image, selecting a portion to be filtered in accordance with the detection result, and filtering only a portion including a distortion is also proposed.

However, in the distortion removal technique described in the prior art, a drawback of blurring in an image still remains unsolved, and a block distortion amount, or the like must be calculated, thus requiring a long processing time. For this reason, the circuit scale and power consumption become very large. Therefore, it is difficult to apply the above-mentioned technique to a product which places an importance on a compact structure and high-speed processing, especially, a product which processes a motion image.

As described above, in compression coding of a motion image by a conventional motion image coding apparatus, the technique for dividing frames to those subjected to intra-frame coding and those subjected to inter-frame coding is popularly used.

The intra-frame coding is a technique for independently performing DCT of an input image frame in units of blocks each consisting of 8×8 pixels to quantize transform coefficients, and then performing variable length coding of the quantized value.

On the other hand, the inter-frame coding is the following technique. That is, in order to reduce a decrease in redundancy in the time-base direction due to a motion between an input image frame and a decoded image of the immediately preceding frame, a motion vector is detected in units of blocks each consisting of n×m pixels (e.g., 16×16 pixels), and a motion is compensated in units of blocks. Furthermore, in the inter-frame coding, a difference is calculated between a motion-compensated predicted image and an input image, and DCT is performed in units of blocks each including, e.g., 8×8 pixels to quantize transform coefficients. Thereafter, the quantized value is subjected to variable length coding.

Such compression coding allows compression with high efficiency, it is adopted in H. 261 as the international standards of television radio waves, and MPEG (Motion Picture Experts Group) as the international standards of storage media.

However, the compression coding by the above-mentioned motion image coding apparatus basically uses DCT in units of blocks. For this reason, when a high compression ratio is to be attained, since it is controlled to increase the quantization step size of the DCT coefficients, the quantization error increases, and as a result, discontinuity at the block boundaries in a decoded image becomes conspicuous. This deterioration is generally called a block distortion.

In particular, when an image obtained from an ultrasonic diagnostic apparatus is compressed by such a compression technique using DCT, a block distortion appears more conspicuously than a normal image.

SUMMARY OF THE INVENTION

It is, therefore, an object of the present invention to provide a new and improved motion-adaptive image signal processing system such as a motion image signal compression apparatus which can suppress deterioration of image quality generated after a scene change.

It is another object of the present invention to provide an image signal decoding apparatus which can remove a distortion at high speed with a simple circuit without generating a blur in an image.

It is still another object of the present invention to provide a motion image coding apparatus which can suppress generation of a block distortion even for an image in which, normally, a block distortion conspicuously appears.

It is still another object of the present invention to provide a motion image coding apparatus which can suppress deterioration of image quality generated after a scene change, and has a small hardware scale and a short coding delay time.

According to an aspect of the present invention, there is provided a motion image signal compression apparatus for selectively performing intra-frame coding and inter-frame coding by selectively using an image signal of a current frame, an image signal of a previous frame, and a decoded image signal of the previous frame with respect to an input image signal which is continuously input in units of frames, comprising: inter-frame predicted error signal generation means for generating an inter-frame predicted error signal for selectively performing prediction between the image signal of the current frame and the decoded image signal of the previous frame, and between the image signal of the current frame and the image signal of the previous frame; coding means for selectively coding the inter-frame predicted error signal generated by the inter-frame predicted error signal generation means and the input image signal with high-efficiency compression; statistical amount calculation means for calculating a statistical amount of the inter-frame predicted error signal generated by the inter-frame predicted error signal generation means; and discrimination means for discriminating, based on the statistical amount of the inter-frame predicted error signal calculated by the statistical amount calculation means, whether or not coding by the coding means is to be performed, wherein when the discrimination means discriminates that coding by the coding means is not to be performed, the apparatus transmits a discrimination signal indicating that coding is not to be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the arrangement of a decoder unit according to the first embodiment of the present invention;

FIG. 4 is a block diagram showing the arrangement of a decoder unit according to the second embodiment of the present invention;

FIG. 5 is a block diagram showing the arrangement for compressing a valid/invalid block discrimination flag;

FIG. 6 is a view for explaining the effect of the embodiments;

FIG. 7 is a block diagram showing a modification of the first and second embodiments;

FIGS. 20A and 20B are views showing the relationship between the frequency and the motion vector in a block line;

FIGS. 21A to 21C are views showing the relationship between the frequency and the motion vector in two-split block lines;

FIG. 23 is a block diagram showing a motion image coding apparatus according to the eighth embodiment of the present invention;

DETAILED DESCRIPTION OF THE PREFERRED EMBODIMENTS

Figure 1:
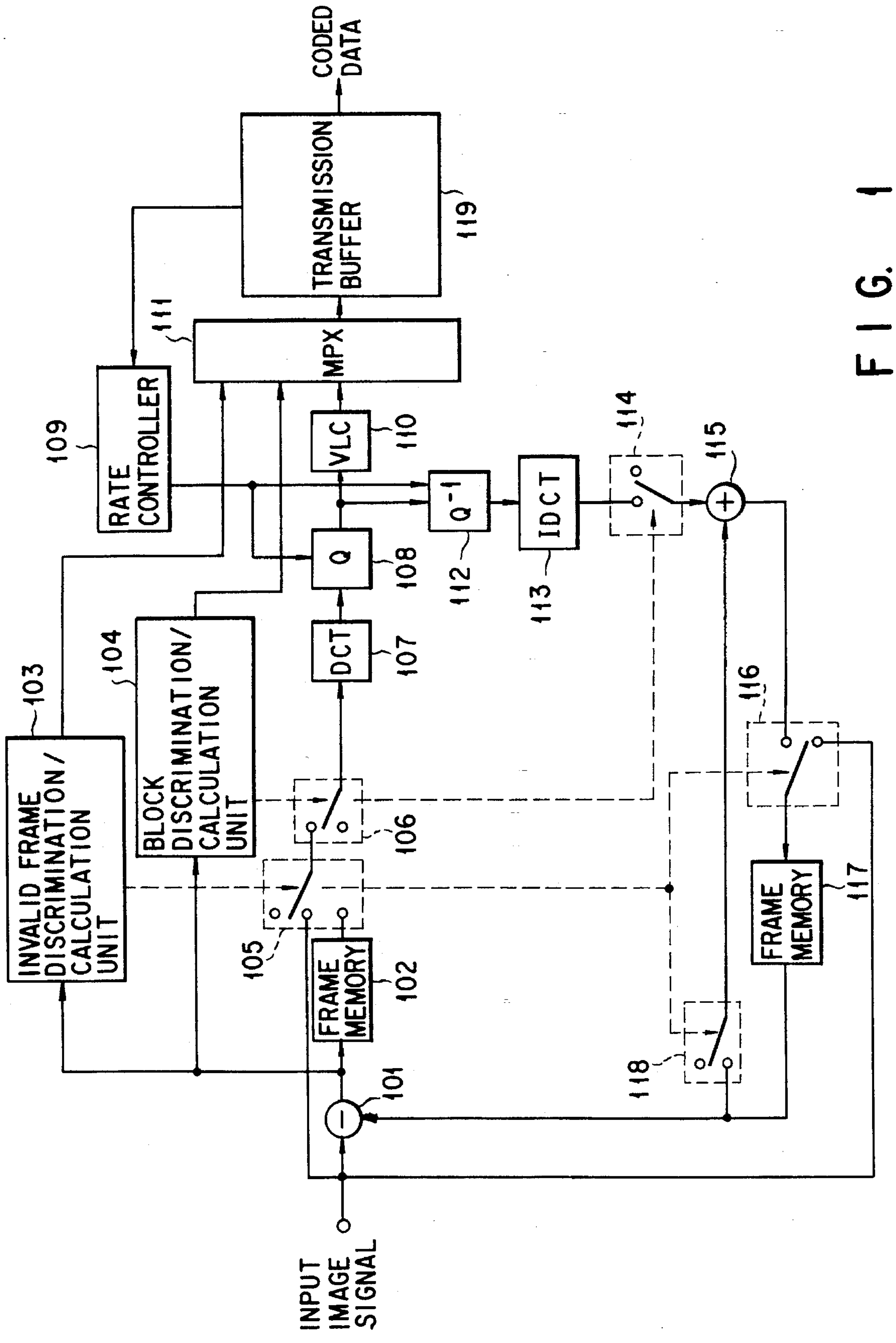
FIG. 1 is a block diagram showing the arrangement of a coder unit according to the first embodiment of the present invention.

Reference will now be made in detail to the presently preferred embodiments of the invention as illustrated in the accompanying drawings, in which like reference characters designate like or corresponding parts throughout the several drawings.

FIG. 1 is a block diagram showing the arrangement of a coder unit according to the first embodiment of the present invention.

Referring to FIG. 1, an input image signal is input to a subtracter 101, and switches 105 and 116. On the other hand, the subtracter 101 receives the previous frame image signal (an original image or a decoded image) stored in a frame memory 117, so that the previous frame image signal is subtracted from the current frame input image signal in units of pixels. The subtraction result (difference frame image signal) is stored in a frame memory 102. The subtraction result is also supplied to an invalid frame discrimination/calculation unit 103 for discriminating and calculating invalid frames in and between frames, and a block discrimination/calculation unit 104 for discriminating and calculating valid and invalid blocks. These units calculate parameters for controlling switches 105, 106, 114, 116, and 118 using the subtraction result.

The switch 105 selects one of the current frame input image signal, the difference frame image signal from the frame memory 102, and an input signal OFF state in accordance with a control signal from the invalid frame discrimination/calculation unit 103. The invalid frame discrimination/calculation unit 103 calculates a statistical value by accumulating the absolute value sums of inter-frame difference signals as inputs for one frame, and determines the calculation result to be a discrimination parameter. The switch 105 is controlled as follows. That is, when the discrimination parameter is larger than a predetermined threshold value, thereby indicating an ineffective or invalid frame the switch 105 selects the input signal OFF state. When the parameter is equal to or smaller than the predetermined threshold value, thereby indicating an effective or valid frame and the current frame has a predetermined frame interval (every predetermined time interval) and corresponds to a frame immediately after the input signal OFF state is canceled, the switch 105 selects the input image signal. Otherwise, the switch 105 selects the inter-frame difference signal.

The switch 106 which receives the signal selected by the switch 105 performs an ON/OFF operation of the input signal in accordance with a control signal corresponding to a discrimination parameter from the block discrimination/calculation unit 104.

The block discrimination/calculation unit 104 calculates the absolute value sum of the inter-frame difference signals and the amplitude value of a maximum inter-frame difference signal in each block (consisting of, e.g., 8×8 pixels), and compares these values as discrimination parameters with a predetermined threshold value, thus outputting a control signal.

However, in case of the intra-frame coding, the switch 106 is turned on for all blocks.

when the switch 106 is turned on, output data from the switch 106 is subjected to discrete cosine transform (orthogonal transform) in units of blocks by a DCT (discrete cosine transformer) 107, and transform coefficients are input to a quantizer (Q) 108. The step size used in quantization of the quantizer 108 is given by $Q_s \times W_{ij}$, i.e., is obtained by multiplying a weighting coefficient $W_{ij}$ (i and j are indices indicating a coefficient position) corresponding to each transform coefficient with a quantization scale $Q_s$ as an output from a rate controller 109.

The transform coefficients quantized by the quantizer 108 are input to a variable length coder (VLC) 110 and an inverse quantizer ($Q^{-1}$) 112. The VLC 110 converts the input quantized values into variable length codes by high-efficiency compression, and the converted codes are output to a multiplexer (MPX) 111.

The MPX 111 also receives discrimination flag data from the invalid frame discrimination/calculation unit 103, and valid/invalid block discrimination flag data from the block discrimination/calculation unit 104. The MPX 111 outputs a bit stream according to a predetermined format to a transmission buffer 119. Data stored in the transmission buffer 119 are output to a recording system or a transmission system (neither are shown) at a predetermined rate.

The data storage amount in the transmission buffer 119 is supplied to the rate controller 109. The rate controller 109 supplies the quantization scale $Q_s$ corresponding to the received data storage amount to the quantizer 108 and the inverse quantizer 112.

The quantized values of the transform coefficients input to the inverse quantizer 112 are multiplied with the corresponding quantization step sizes each obtained by the quantization scale $Q_s \times$the weighting coefficient $W_{ij}$ at the corresponding transform coefficient position so as to be restored to the transform coefficient values. The transform coefficient values are transformed to pixel values by an inverse discrete cosine transformer (IDCT) 113, and the pixel values are input to the switch 114.

The switch 114 is controlled to be turned on when the discrimination flag from the block discrimination/calculation unit 104 indicates a valid block. When the switch 114 is ON, the pixel values output from the IDCT 113 are input to an adder 115. On the other hand, previous frame decoded image data stored in the frame memory 117 is input to the adder 115 via the switch 118. The switch 118 is controlled to be turned on when the discrimination flag as an output from the invalid frame discrimination/calculation unit 103 indicates inter-frame coding.

The previous frame decoded image data as an output from the adder 115 is input to the switch 116. The other input of the switch 116 receives the current frame input image data. When the discrimination parameter as the output from the invalid frame discrimination/calculation unit 103 indicates intra-frame coding or inter-frame coding, the switch 116 selects the output from the adder 115; when the discrimination parameter indicates an invalid frame, the switch 116 selects the current frame input image data, thereby rewriting data in the frame memory 117. The rewritten data is used as a reference image signal for the next frame to be coded, and is output to the subtracter 101.

FIG. 2 is a block diagram showing the arrangement of a decoder unit according to the first embodiment of the present invention.

Coded data coded by the above-mentioned coder unit is input to a reception buffer 201. Data stored in the buffer 201 is read by a selector 202. The selector 202 selectively outputs a discrimination parameter to an invalid frame discrimination/calculation unit 203 and a block discrimination/calculation unit 204, and compression-coded data to a VLD (variable length decoder) 205.

The data input to the VLD 205 is decoded to generate quantized values. The quantized values are restored to transform coefficient values by an inverse quantizer ($Q^{-1}$) 206. The transform coefficient values are transformed to pixel values by an IDCT (inverse discrete cosine transformer) 207.

A switch 208 which receives the pixel data is turned on only when a control signal from the block discrimination/calculation unit 204 indicates a valid block. Thus, an adder 209 adds the pixel data and decoded image data supplied from a frame memory 212 via a switch 210. The switch 210 is switched by a control signal from the invalid frame discrimination/calculation unit 203. More specifically, when the control signal from the invalid frame discrimination/calculation unit 203 indicates inter-frame coding, the switch 210 is turned on; when the control signal indicates intra-frame coding or an invalid frame, the switch 210 is turned off.

A switch 211 which receives the output from the adder 209 is turned on when the control signal from the invalid frame discrimination/calculation unit 203 indicates intra-frame coding and inter-frame coding. Thus, the output from the adder 209 is supplied to a memory in a display device (not shown).

Furthermore, the output from the adder 209 is stored in the frame memory 212, thus rewriting the contents of the memory 212 with newly decoded image data.

If the invalid frame discrimination/calculation unit 203 discriminates an invalid frame, since this decoder does not output any image, the display device (not shown) repetitively displays the latest image which was decoded previously.

Figure 3:
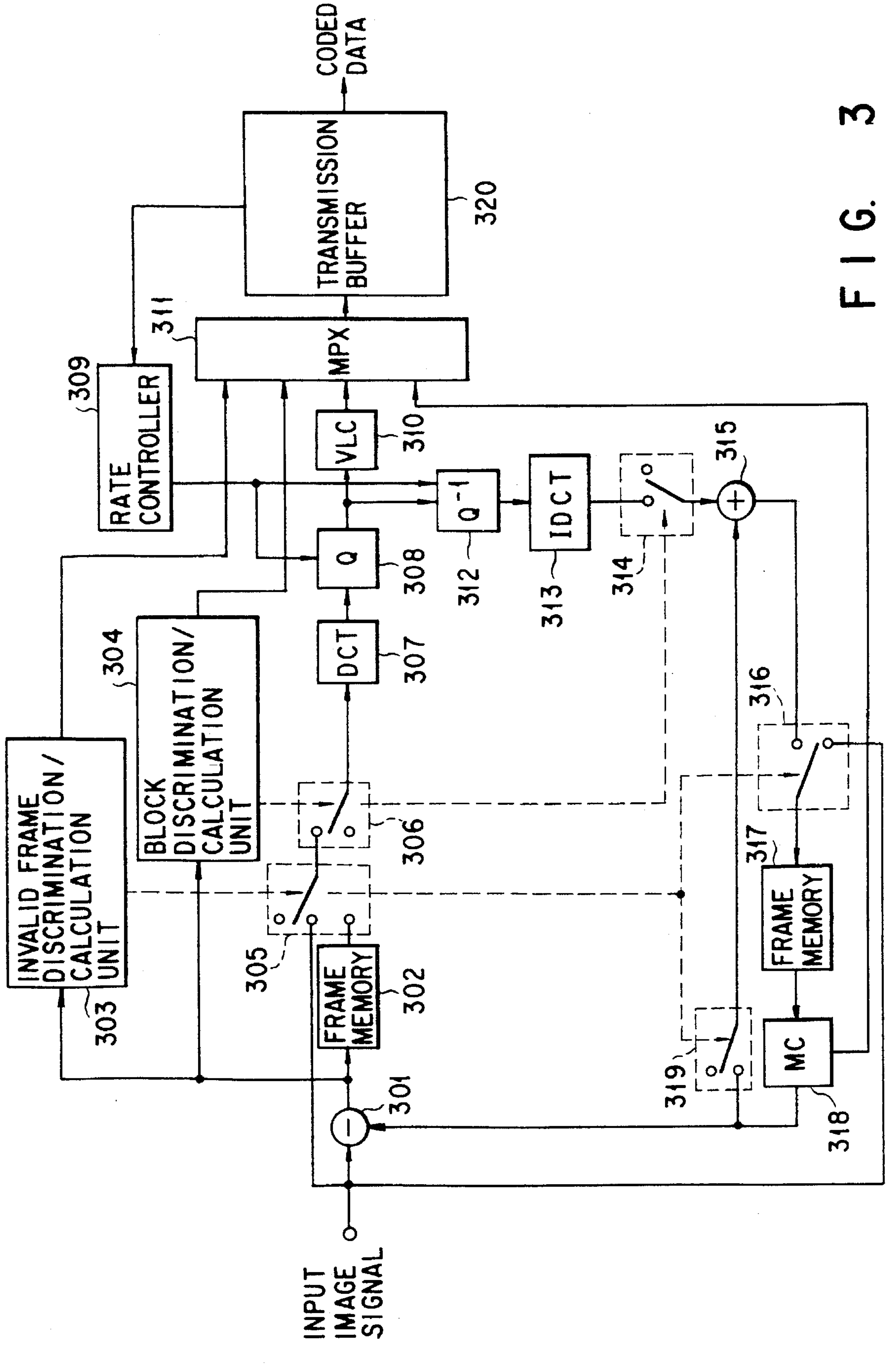
FIG. 3 is a block diagram showing the arrangement of a coder unit according to the second embodiment of the present invention.

FIG. 3 is a block diagram showing the arrangement of a coder unit according to the second embodiment of the present invention.

Referring to FIG. 3, an input image signal is input to a subtracter 301, and switches 305 and 316. On the other hand, the subtracter 301 also receives a motion-compensated predicted image signal from an MC (motion-compensated predictor) 318, and subtracts the motion-compensated predicted image signal from the current frame input image signal in units of pixels. The subtraction result is stored in a frame memory 302. The subtraction result is also output to an invalid frame discrimination/calculation unit 303 and a block discrimination/calculation unit 304. These units 303 and 304 calculate parameters for controlling switches 305, 306, 314, 316, and 319 using the subtraction result.

The switch 305 selects one of the current frame input image signal, the motion-compensated predicted error from the frame memory 302, and an input signal OFF state in accordance with a control signal from the invalid frame discrimination/calculation unit 303. The invalid frame discrimination/calculation unit 303 performs a calculation by accumulating the absolute value sums of inter-frame difference signals as inputs for one frame, and determines the calculation result to be a discrimination parameter. The switch 305 is controlled as follows. That is, when the discrimination parameter is larger than a predetermined threshold value, the switch 305 selects the input signal OFF state. When the parameter is equal to or smaller than the predetermined threshold value, and the current frame has a predetermined frame interval (every predetermined time interval) and corresponds to a frame immediately after the input signal OFF state is canceled, the switch 305 selects the input image signal. Otherwise, the switch 305 selects the inter-frame difference value.

The switch 306 which receives the selected signal performs an ON/OFF operation of the input signal in accordance with a discrimination parameter from the block discrimination/calculation unit 304.

The block discrimination/calculation unit 304 calculates the absolute value sum of the motion-compensated predicted error values and the amplitude of a maximum motion-compensated predicted error value in each block (consisting of, e.g., 8×8 pixels), and compares these values as discrimination parameters with a predetermined threshold value, thus outputting a control signal.

When the switch 306 is turned on, output data from the switch 306 is subjected to discrete cosine transform in units of blocks by a DCT (discrete cosine transformer) 307, and transform coefficients are input to a quantizer (Q) 308. The quantization step size used in quantization of the quantizer 308 is given by $Q_s \times W_{ij}$, i.e., is obtained by multiplying a weighting coefficient $W_{ij}$ (i and j are indices indicating a coefficient position) corresponding to each transform coefficient with a quantization scale $Q_s$ as an output from a rate controller 309.

The transform coefficients quantized by the quantizer 308 are input to a variable length coder (VLC) 310 and an inverse quantizer ($Q^{-1}$) 312. The VLC 310 converts the input quantized values into variable length codes, and the converted codes are output to a multiplexer (MPX) 311.

The MPX 311 also receives discrimination flag data from the invalid frame discrimination/calculation unit 303, valid/invalid block discrimination flag data from the block discrimination/calculation unit 304, and a motion vector from the MC 318. The MPX 311 outputs a bit stream according to a predetermined format to a transmission buffer 320. Data stored in the transmission buffer 320 are output to a recording system or a transmission system (neither are shown) at a predetermined rate.

The data storage amount in the transmission buffer 320 is supplied to the rate controller 309. The rate controller 309 supplies the quantization scale $Q_s$ corresponding to the received data storage amount to the quantizer 308 and the inverse quantizer 312.

The quantized values of the transform coefficients input to the inverse quantizer 312 are multiplied with the corresponding quantization step sizes each obtained by the quantization scale $Q_s \times$ the weighting coefficient $W_{ij}$ at the corresponding transform coefficient position so as to be restored to the transform coefficient values. The transform coefficient values are transformed to pixel values by an inverse discrete cosine transformer (IDCT) 313, and the pixel values are output to the switch 314.

The switch 314 is controlled to be turned on when the discrimination flag from the block discrimination/calculation unit 304 indicates a valid block. When the switch 314 is ON, it outputs the pixel values output from the IDCT 313 to an adder 315. On the other hand, previous frame decoded image data stored in a frame memory 317 is subjected to motion-compensated prediction with the current frame image data by the MC 318, and the predicted data is output to the adder 315 via the switch 319. The switch 319 is controlled to be turned on when the discrimination flag as an output from the invalid frame discrimination/calculation unit 303 indicates inter-frame coding.

The switch 316 which receives the decoded image data as an output from the adder 315 and the current frame input image data outputs the decoded image data from the adder 315 when the discrimination parameter as an output from the invalid frame discrimination/calculation unit 303 indicates intra-frame coding or inter-frame coding. The switch 316 outputs the current frame input image data to the frame memory 317 when the discrimination parameter indicates an invalid frame, thereby rewriting data in the frame memory 317.

The rewritten data is used as reference image data for the next frame to be coded, and is input to the subtracter 301 after it is subjected to motion-compensated prediction in the MC 318.

The above-mentioned processing is repeated, and motion image data is compressed.

FIG. 4 is a block diagram showing the arrangement of a decoder unit according to the second embodiment of the present invention.

Referring to FIG. 4, coded data is input to a reception buffer 401. Data stored in the buffer 401 is read by a selector 402. The selector 402 selectively outputs a discrimination parameter to an invalid frame discrimination/calculation unit 403 and a block discrimination/calculation unit 404, compression-coded data to a VLD (variable length decoder) 405, and motion vector data to an MC (motion-compensated predictor) 413. The data input to the VLD 405 is decoded to generate quantized values. The quantized values are restored to transform coefficient values by an inverse quantizer ($Q^{-1}$) 406. The transform coefficient values are transformed to pixel values by an IDCT (inverse discrete cosine transformer) 407.

A switch 408 which receives the pixel data is turned on to output image data to an adder 409 only when a control signal from the block discrimination/calculation unit 404 indicates a valid block. On the other hand, the MC 413 performs motion-compensated prediction of the decoded image data in a frame memory 412 on the basis of motion vector data selectively input from the selector 402, and the prediction result is supplied to the adder 409 via a switch 410. The two data are added to each other to generate a new decoded image, and the new decoded image is output to a switch 411 and the frame memory 412. The switch 410 is controlled to be turned on only when the invalid frame discrimination/calculation unit 403 discriminates inter-frame coding.

The switch 411 is turned on only when the control signal output from the invalid frame discrimination/calculation unit 403 indicates intra-frame or inter-frame coding, and outputs decoded image data to a display device (not shown).

On the other hand, the decoded image data is written in the frame memory 412, and is used as a reference image for generating the next decoded image.

In a conventional motion image coding apparatus, when the inter-frame difference or the motion-compensated predicted error increases due to, e.g., a scene change, the code amount obtained by coding the corresponding frame becomes larger than that obtained by coding a frame which does not correspond to a scene change. When coding is performed at a predetermined rate, since the increased code amount reduces the code amount which can be used by frames to be subsequently coded, several frames with deteriorated image quality continuously appear.

However, according to the first and second embodiment, when coding is performed at a predetermined coding rate, if it is determined that the generated code amount becomes very large, and adversely influences subsequent frames to be coded (the code amount to be generated is limited to a small amount) (in each of the above embodiments, a frame is ineffective if the value obtained by accumulating absolute values of inter-frame difference errors or motion-compensated predicted errors for all pixels in the frame is larger than a threshold value), the corresponding frame is skipped as an invalid frame on the basis of the statistical amount of inter-frame predicted error signals without being coded. Thereafter, not decoded image data but original image data is used as reference image data, and subsequent frames are skipped as invalid frames without being encoded until the absolute value sum of inter-frame errors or motion-compensated predicted errors of the original image data becomes equal to or smaller than the predetermined threshold value to indicate an effective frame. When the discrimination parameter becomes smaller than the threshold value, the corresponding frame is subjected to intra-frame coding. Thereafter, inter-frame coding follows (see FIG. 6).

As described above, according to the present invention, an abrupt increase in generated code amount can be prevented, and deterioration of image quality and overflow of the transmission buffer in the coder upon execution of coding at a predetermined rate can be prevented.

However, when the transmission buffer underflows since a frame is not encoded, a dummy code may be inserted to prevent underflow.

FIG. 5 is a block diagram showing the arrangement for compressing a valid/invalid block discrimination flag as an output from the block discrimination/calculation unit 104 shown in FIG. 1 or the block discrimination/calculation unit 304 shown in FIG. 3.

The valid/invalid block discrimination flag requires 1-bit information per block. At a high compression ratio, this information value is not negligible as compared to the overall information amount. For this reason, this valid/invalid block discrimination flag must be compressed. In this embodiment, an output from a block discrimination/calculation unit 501 is input to an XOR (exclusive OR gate) 502. The XOR 502 also receives a valid/invalid block discrimination flag one frame before (data at the same block position as the discrimination flag output from the block discrimination/calculation unit 501) stored in a memory 503. The XOR 502 outputs an XOR of these two pieces of bit information to a switch 506 and an XOR (exclusive 0R gate) 504.

The other data input to the XOR 504 is the same data as that output from the memory 503 to the XOR 502. When an XOR is calculated by the XOR 504, the current valid/invalid block discrimination flag is decoded, and the contents of the memory 503 are rewritten. The rewritten data is used as reference data of a valid/invalid block discrimination flag of the next frame.

The switch 506 which directly receives the output from the XOR 502 and the output from the block discrimination/calculation unit 501 outputs the output from the block discrimination/calculation unit 501 when a control signal from an invalid frame discrimination/calculation unit 505 indicates intra-frame coding; the switch 506 outputs the output from the XOR 502 when the control signal indicates inter-frame coding. The output from the switch 506 is input to a binary data compression coder 507, and valid/invalid block discrimination flag data for one frame is compressed. The compressed data is output to an MPX (111 in FIG. 1 or 311 in FIG. 3).

In an image in which a variation in valid/invalid block is small between adjacent frames (an ultrasonic image or a video telephone image), most of data can be set to be "0" by calculating an XOR between adjacent frames, thus compressing valid/invalid block discrimination flag information. As a result, the remaining code amount can be assigned to data of another portion, and high image quality can be realized.

FIG. 7 shows a modification of the first and second embodiments. Referring to FIG. 7, a rate controller 702, which receives buffer occupation amount data from a transmission buffer 703 (119 in FIG. 1 or 320 in FIG. 3), generates a quantization scale corresponding to the occupation amount data. The quantization scale is supplied to a quantizer (Q) 704 and an inverse quantizer ($Q^{-1}$) 705, and is also output to an invalid frame discrimination/calculation unit 701. The invalid frame discrimination/calculation unit 701 calculates an absolute value sum from an inter-frame difference value of a frame to be coded as another input, and generates an invalid frame discrimination parameter. A threshold value to be compared with the invalid frame discrimination parameter is not fixed but is variable depending on the value of the quantization scale. More specifically, as the quantization scale becomes smaller, the discrimination threshold value is increased. Conversely, as the quantization scale becomes larger, the discrimination threshold value is decreased.

Thus, when the transmission buffer 703 has a sufficient margin for storing data, a condition for determining an invalid frame is moderated to decrease the number of frames skipped as invalid frames. Conversely, when the transmission buffer 703 does not have a sufficient margin, a condition for determining an invalid frame is made strict, and many frames are forcibly skipped, thus improving image quality of a coded frame as much as possible within a code amount which can be used.

As described above, according to a motion image compression apparatus of the first and second embodiments of the present invention, when it is predicted that the generated code amount becomes too large upon execution of inter-frame coding, since the corresponding frame is not coded, sufficient code amounts can be provided to frames after the corresponding frame without overly reducing generated code amounts of these subsequent frames. Therefore, deterioration of image quality can be prevented even in a scene change.

Figure 8:
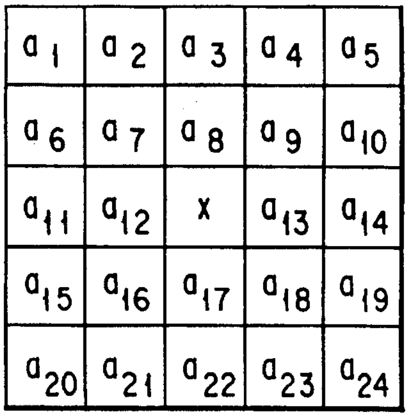
FIG. 8 is a view showing the contents of a sigma filter for removing mosquito noise, which filter is applied to an image signal decoding apparatus according to the third embodiment of the present invention.

FIG. 8 shows the contents of a sigma filter used for removing mosquito noise as distortion removal processing used in an image signal decoding apparatus according to the third embodiment of the present invention.

If x in FIG. 8 is the pixel of interest to be processed, and $a_1$ to $a_{24}$ are pixels around the pixel of interest, a value x' of new x is given by:

$$x' = x - \sum_{k=1}^{24} b_k F(x - a_k) \tag{1}$$

where $b_k$ is a weighting coefficient which changes according to the distance from the pixel of interest.

$$F(y) = \begin{cases} y, & |y| \leq \theta \\ \phi, & |y| > \theta \end{cases} \tag{2}$$

where θ is a threshold value, and is a parameter for changing noise removal characteristics. In general, when the value θ is increased, the mosquito noise removal effect is enhanced, and a noisy signal in an image can be removed. Conversely, when θ is decreased, the filter effect becomes small, and when θ=0, processing equivalent to that without any filter is performed.

In this embodiment, the value of $b_1$ to $b_{24}$ is set to be 1/24. This value is properly selected in correspondence with the distortion removal characteristics, and experimentally, it is desirable to select a value which satisfies $\Sigma b_k = 1$. Furthermore, it is desirable that θ be about 1/10 of a maximum pixel value. For example, if an image is 8-bit data, distortion removal can be satisfactorily performed by setting θ to be about 20 to 30.

Then, an example of adaptively applying the sigma filter will be described below.

As described above, the characteristics of this filter can be changed by changing the value θ. More specifically, the conspicuousness level of mosquito noise is discriminated from motion information, as described above, and the filter characteristics are changed based on the discrimination result, thus eliminating mosquito noise.

A technique of calculating the conspicuousness level of mosquito noise in units of blocks in an image, and changing the value θ by utilizing the calculated level will be explained below.

Figure 10:
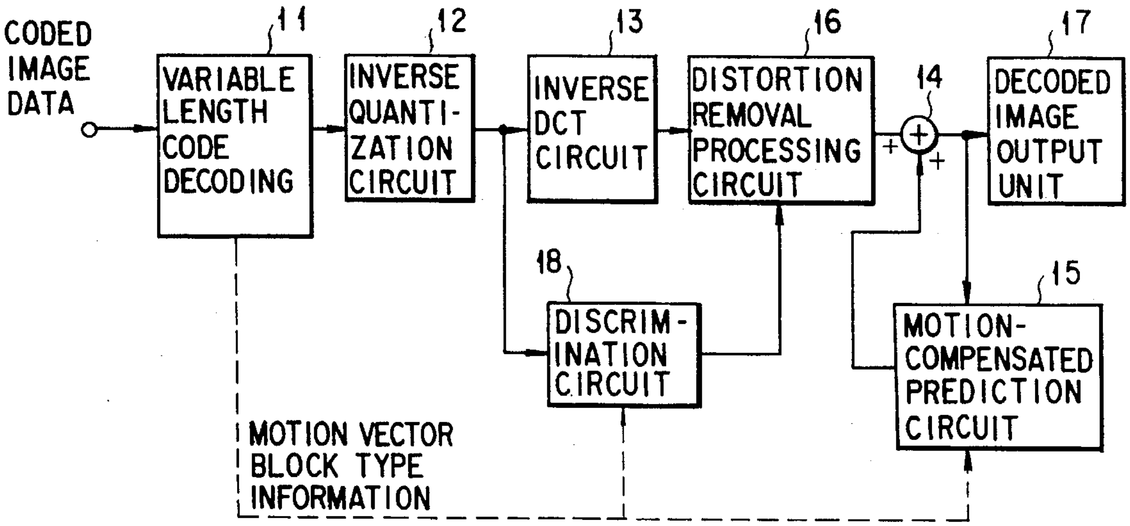
FIG. 10 is a block diagram of a decoding apparatus for realizing distortion removal processing according to the third embodiment of the present invention.

Referring to FIG. 10 (to be described later), DCT coefficients are input to a discrimination circuit 18 in units of blocks, and the absolute value sum of AC coefficients is calculated. Since the complexity level of a pattern in a corresponding block can be estimated from power on a spatial frequency plane of the calculation result, a block having a high complexity level is filtered with the increased value θ.

Furthermore, in this technique, upon calculation of the absolute value sum of the DCT coefficients, when coefficients which strongly influence the complexity level of a pattern are used in place of coefficients of all AC components, the calculation time can be shortened, and the conspicuousness level of mosquito noise can be precisely discriminated.

Figure 9:
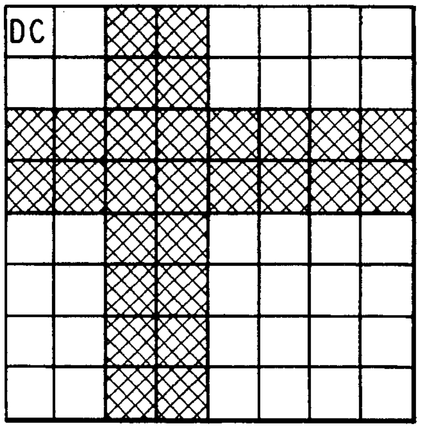
FIG. 9 is a view showing the arrangement of DCT coefficients in an 8×8 block.

FIG. 9 shows the arrangement of DCT coefficients in an 8×8 block. In FIG. 9, the upper left corner corresponds to the DC component.

In this embodiment, the absolute value sum of DCT coefficients in a hatched portion in FIG. 9 is calculated. When the calculated value is large, the value θ is increased; when the calculated value is small, the value θ is decreased. With this processing, the mosquito noise removal filter can be adaptively applied not only to a motion image but also to a still image.

An image signal decoding apparatus for performing distortion removal processing according to the third embodiment of the present invention will be described below with reference to FIG. 10.

As shown in FIG. 10, coded image data which is decoded to code data in units of blocks of an image by a variable length code decoding circuit 11 is restored to an inter-frame difference signal via an inverse quantization circuit 12 and an inverse DCT circuit 13, and is subjected to distortion removal processing in a distortion removal processing circuit 16. Thereafter, the decoded image data is output to an addition circuit 14. The output from the addition circuit 14 is re-added via a motion-compensated prediction circuit 15, and is supplied to an image output unit 17 as a reproduced image.

More specifically, in this embodiment, the distortion removal processing is performed before a signal using an inter-frame correlation is subjected to motion compensation, i.e., is performed for an image obtained by decoding a signal recorded as DCT coefficients.

For example, a signal of the (n+1)-th frame which signal is obtained by calculating a difference signal from the n-th frame is compressed and recorded as an inter-frame difference signal, and an original image cannot be obtained by decoding this signal. However, a distortion caused by compression is expressed in the decoded signal of this inter-frame difference signal, and when the decoded signal is added to the reproduced signal of the n-th frame, the distortion is accumulated.

Thus, in this embodiment, a distortion is removed in the process of obtaining an inter-frame difference signal, and thereafter, the difference signal is added to that of the previous frame with this arrangement, since DCT coefficients for an inter-frame difference signal are used for determining distortion removal characteristics, a distortion can be removed most efficiently. In this arrangement, distortion removal processing is performed not for a so-called reproduced image added with the motion-compensated previous frame signal but for an inter-frame difference signal, and the processed signal is added to the previous frame signal.

In this case, since images subjected to the distortion removal processing are added in units of frames, if frames using inter-frame differences continue, a difference between a motion-compensated predicted image upon coding and a motion-compensated predicted image upon decoding becomes large, and the error becomes conspicuous, contrary to the intended effect. Thus, an example of a coding apparatus suitable for the decoding apparatus shown in FIG. 10 will be described below with reference to FIG. 11.

Figure 11:
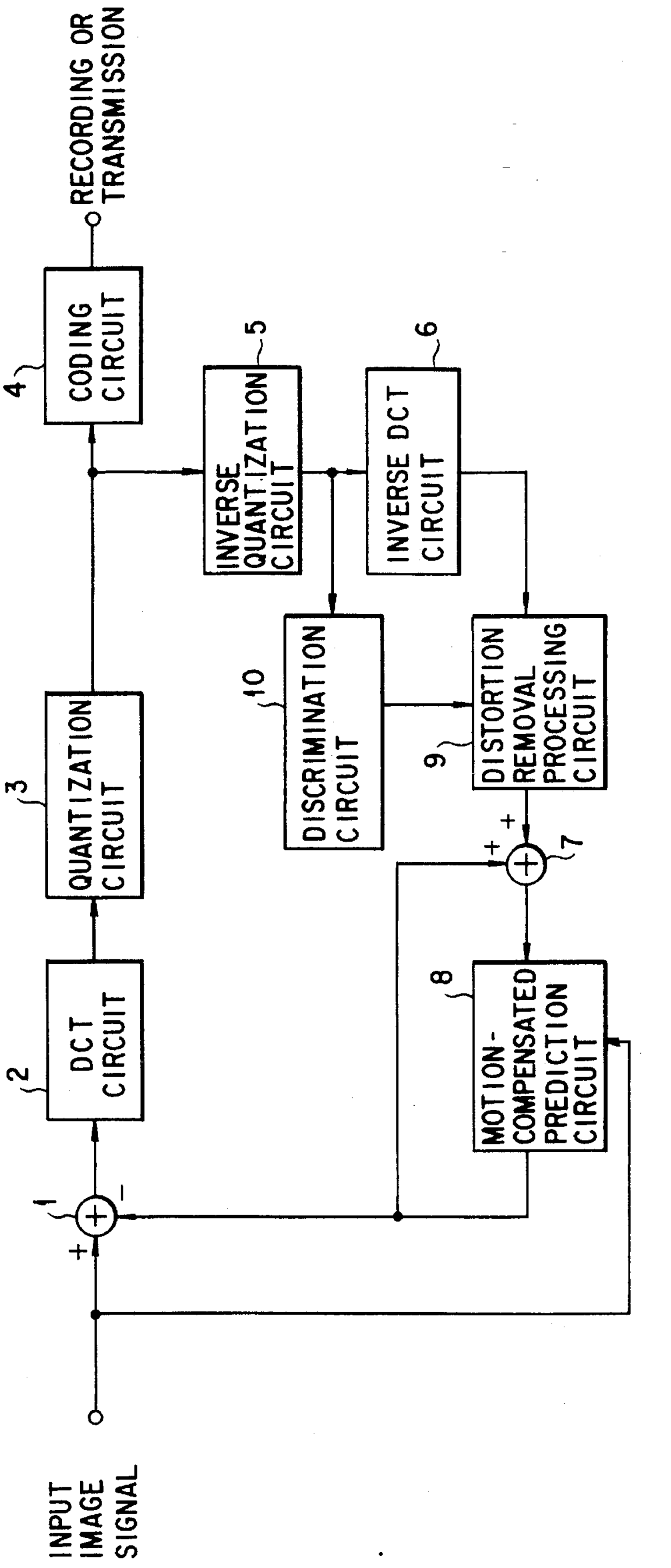
FIG. 11 is a block diagram showing the arrangement of a coding apparatus suitable for the decoding apparatus shown in FIG. 10.
Figure 25:
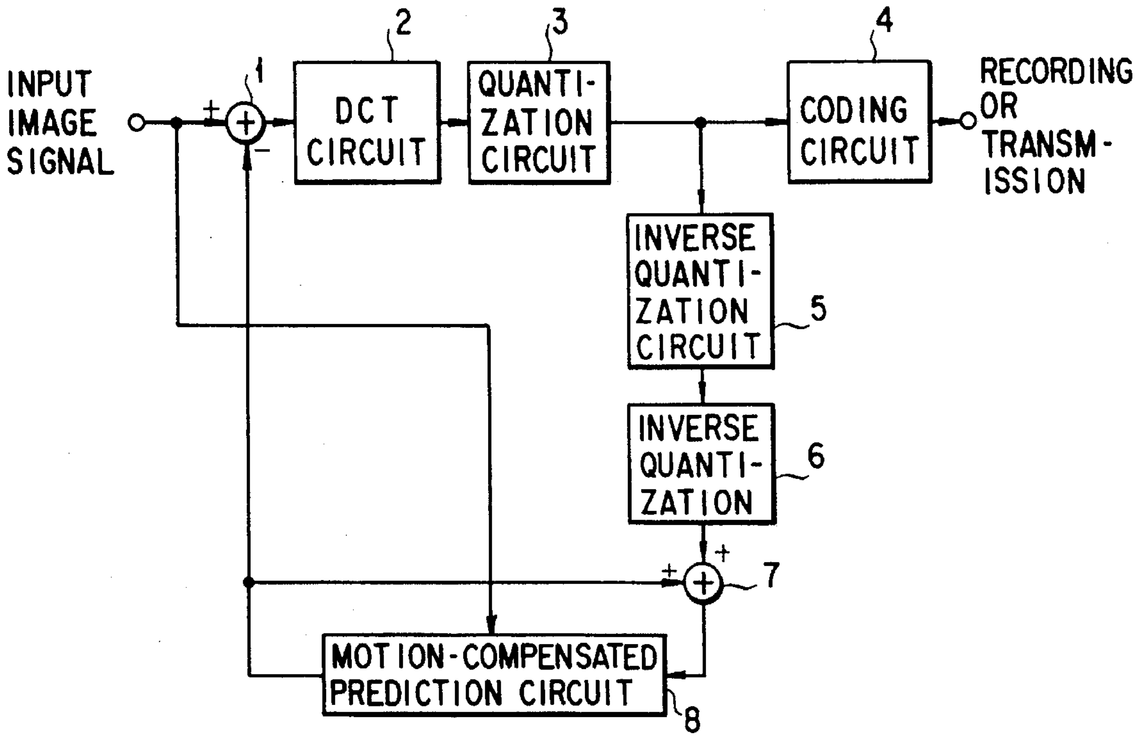
FIG. 25 is a block diagram showing a conventional motion image compression technique utilizing an inter-frame correlation.
Figure 26:
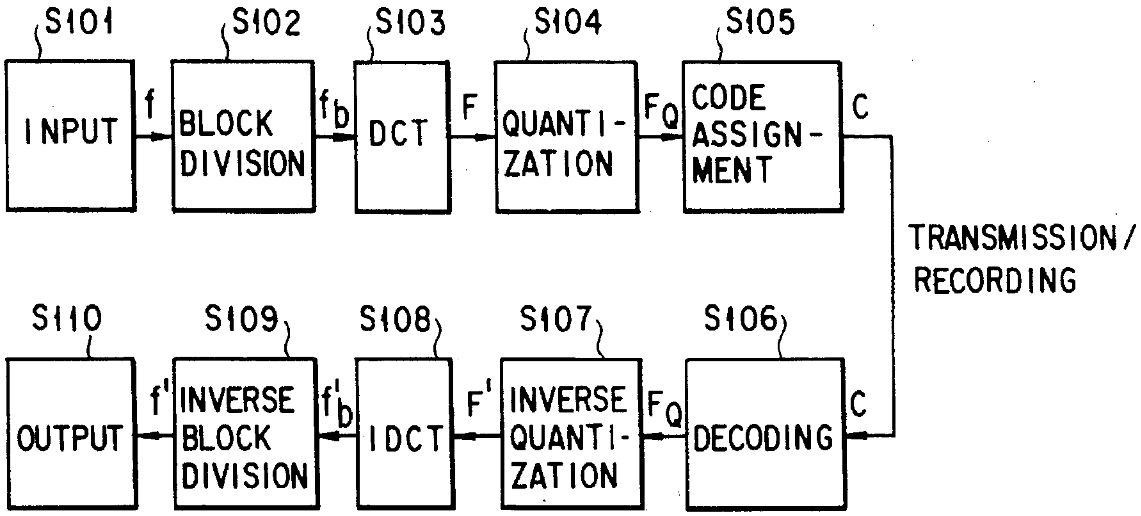
FIG. 26 is a diagram for explaining the operation principle of compression of a still image signal by a coding technique utilizing DCT.

FIG. 11 shows an example wherein the decoding technique shown in FIG. 10 is used in a local decoder in a conventional image compression technique shown in FIG. 25.

Referring to FIG. 11, a predicted error signal from which a motion-compensated inter-frame predicted image is subtracted by a differential circuit 1 is coded by a DCT circuit 2, a quantization circuit 3, and a coding circuit 4. On the other hand, the quantization result is decoded by an inverse quantization circuit 5 and an inverse DCT circuit 6, and the decoded result is supplied to a distortion removal processing circuit 9. In the distortion removal processing at this time, its characteristics are determined by a discrimination circuit 10 using the same technique as in the above-mentioned decoding apparatus. The distortion removal processing result is added to the motion-compensated inter-frame predicted image by an addition circuit 7.

A motion-compensated prediction circuit 8 incorporating an image memory which has a motion compensation variable delay function calculates a motion vector to generate a motion-compensated inter-frame predicted image of the next frame.

Although not shown in FIGS. 10 and 11, in the image compression technique using the apparatus of this embodiment, intra-frame compression is inserted at predetermined frame intervals. At this time, a signal from the motion-compensated prediction circuit 8 is not used. More specifically, the memory in the motion-compensated prediction circuit 8 is reset.

As described above, according to the third embodiment of the present invention, a distortion can be removed at high speed with a simple circuit without causing a blur in an image.

Each of the first and second embodiments described above proposes a countermeasure against a scene change upon execution of inter-frame coding. More specifically, when an inter-frame predicted error sum (including a simple inter-frame difference sum) is larger than a predetermined threshold value, the current frame is not coded.

Then, the next frame is not coded when the inter-frame predicted error sum between the input image of the current image and an input image of the next frame is larger than the predetermined threshold value. Such processing is repeated, and when the inter-frame predicted error sum becomes equal to or smaller than the predetermined threshold value, intra-frame coding is performed for the corresponding frame, thus preventing a decrease in coding efficiency.

However, in motion image compression coding by the above-mentioned motion image coding apparatus, whether or not coding is performed is discriminated after the inter-frame predicted error is calculated. For this reason, in order to compress motion images in real time, at least one frame buffer and a buffer for image data input during the coding processing time are required. As a result, the hardware scale becomes large, and the coding delay amount becomes larger than one frame period.

The fourth and fifth embodiments of the present invention, which can solve the above-mentioned problems, will be described below.

Figure 12:
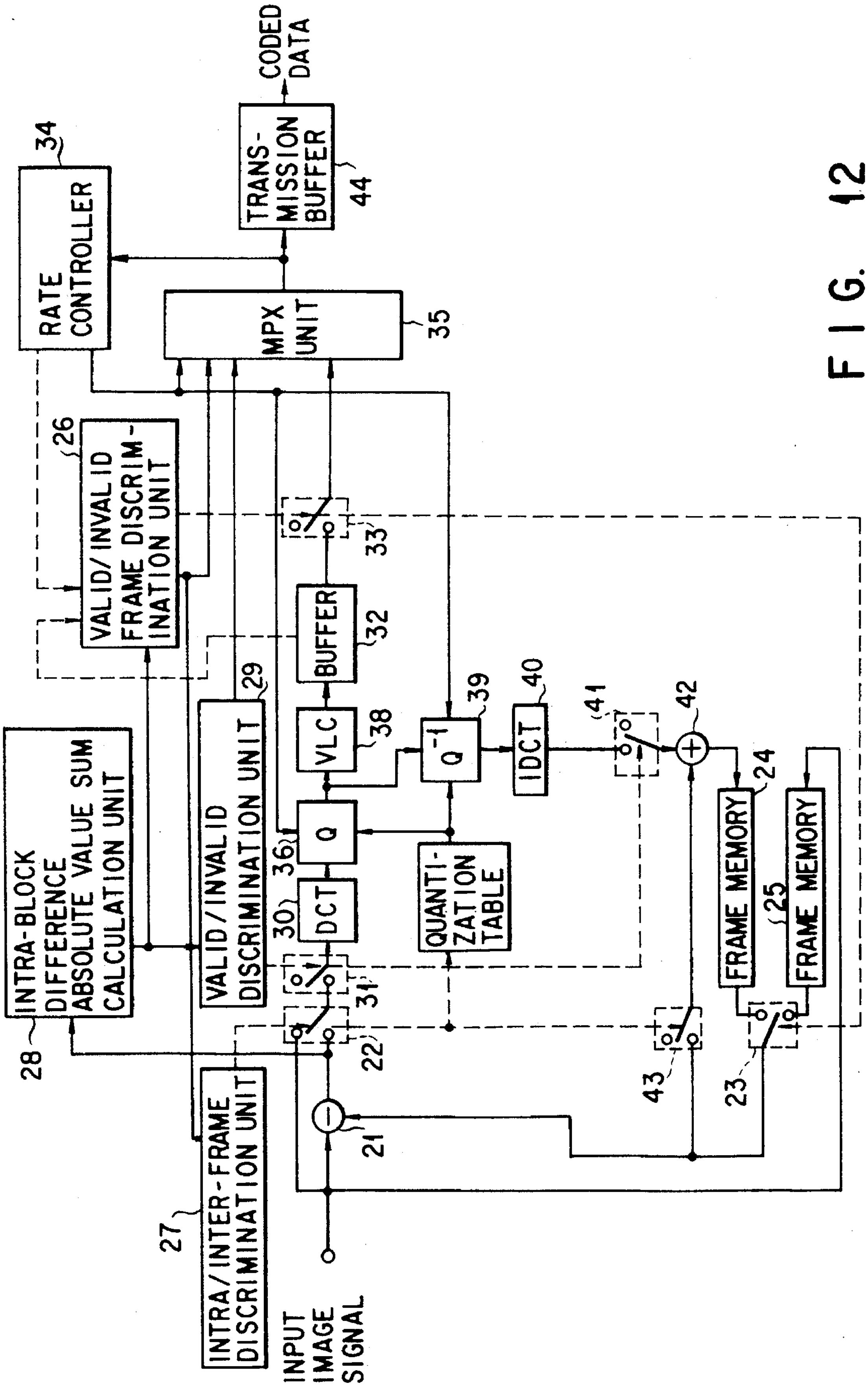
FIG. 12 is a block diagram showing a motion image coding apparatus according to the fourth embodiment of the present invention.

FIG. 12 shows the arrangement of a motion image coding apparatus according to the fourth embodiment of the present invention.

In this motion image coding apparatus, an input image signal is input to a switch 22 in units of blocks (each consisting of, e.g., 8×8 pixels) directly and via a subtracter 21 in the form of difference data. The subtracter 21 selectively receives, as the other input, one of decoded image data of the previous frame stored in a frame memory 24 and original image data of the previous frame stored in a frame memory 25 via a switch 23 in accordance with a discrimination output from a valid/invalid frame discrimination unit 26. When the discrimination output indicates a valid frame, the decoded image data of the previous frame is selected; when the discrimination output indicates an invalid frame, original image data of the previous frame is selected.

An intra/inter-frame discrimination unit 27 controls the switch 22 to output the input image signal so as to perform intra-frame encoding, for the first frame input within a predetermined time period (e.g., ½ sec) or when the signal output from the valid/invalid frame discrimination unit 26 indicates an invalid frame. Otherwise, the unit 27 controls the switch 22 to output difference data from the subtracter 21.

The difference data as the output from the subtracter 21 is also input to an intra-block absolute difference absolute value sum calculation unit 28, and the absolute value sum of difference data is calculated. The difference absolute value sum is output to a valid/invalid block discrimination unit 29 and the valid/invalid frame discrimination unit 26.

The valid/invalid block discrimination unit 29 compares the input intra-block difference absolute value sum with predetermined threshold value 1. When the sum is equal to or larger than threshold value 1, the unit 29 switches a switch 31 to supply the output from the switch 22 to a DCT 30; when the sum is smaller than threshold value 1, the unit 29 switches the switch 31 not to supply the output from the switch 22 to the DCT 30.

The valid/invalid frame discrimination unit 26 adds intra-block difference absolute value sums for one frame. When the intra-frame difference absolute value sum is equal to or larger than predetermined threshold value 2 or the code amount for one frame stored in a buffer 32 is equal to or larger than threshold value 3, the unit 26 controls to disconnect a switch 33; otherwise, the unit 26 controls to connect the switch 33. Furthermore, when a rate controller 34 determines that the transmission buffer 32 overflows, the unit 26 controls to disconnect the switch 33. These control operations are similarly performed even in intra-frame coding.

The valid/invalid block discrimination unit 29 outputs 1-bit information per block, which indicates a valid or invalid block, to a multiplexer (MPX) 35. The valid/invalid frame discrimination unit 26 outputs 1-bit information per frame, which indicates a valid or invalid frame, to the MPX 35.

Original image block data of 8×8 pixels or inter-frame difference image data from the switch 31 is input to the DCT 30, and is subjected to discrete cosine transform. The transformed data is input to a quantizer (Q) 36. The quantizer 36 selectively receives one of two different quantization matrices (in each of which weighting coefficients corresponding to transform coefficients are aligned in a matrix) which are prestored in a quantization table 37, and are selected in accordance with a discrimination result (indicating intra- or inter-frame coding) from the intra/inter-frame discrimination unit 27. Furthermore, the quantizer 36 receives a quantization scale from the rate controller 34. The quantizer 36 multiplies the quantization matrix with the quantization scale to calculate a quantization step size of each transform coefficient, and linearly quantizes each transform coefficient as an output from the DCT 30 using the calculated quantization step size.

The quantized transform coefficients are input to a variable length coder (VLC) 38 and an inverse quantizer ($Q^{-1}$) 39. The VLC 38 outputs, to the buffer 32, a Huffman code corresponding to a difference value from that in the previous block in correspondence with the DC component of the transform coefficients, and outputs, to the buffer 32, two-dimensional Huffman codes corresponding to zero runs and non-zero values immediately after the corresponding zero runs in correspondence with linear data obtained by zigzag-scanning AC components from a lower frequency component to a higher frequency component. When zeros continue to the end of a block, the VLC 38 outputs an EOB (End Of Block) code to the buffer 32.

The inverse quantizer 39 receives the same quantization matrix and quantization scale as those of the quantizer 36, generates a quantization step size, and generates inversely quantized transform coefficients by multiplying each quantized value with the corresponding quantization step size. The inverse quantizer 39 then outputs the inversely quantized transform coefficients to an IDCT 40.

The IDCT 40 performs inverse cosine transform of the inversely quantized transform coefficients to generate a decoded data block. The decoded data block is input to a switch 41, and is input to an adder 42 only when the valid/invalid block discrimination unit 29 determines a valid block. When the intra/inter-frame discrimination unit 27 selects intra-frame coding, the adder 42 receives zero by controlling a switch 43; when the unit 27 selects inter-frame coding, the adder 42 receives decoded image data of the previous frame by controlling the switch 43. The adder 42 adds the received data to generate decoded image data of the currently coded image signal, and stores the image data in the frame memory 24.

The frame memory 25 stores original image data. When the valid/invalid frame discrimination unit 26 discriminates a valid frame, the switch 23 is controlled to output decoded image data stored in the frame memory 24 to the switch 43; when the unit 26 discriminates an invalid frame, the switch 23 is controlled to output original image data stored in the frame memory 25 to the switch 43.

The buffer 32 stores variable length coded data for one frame, and outputs the data amount of the stored codes to the valid/invalid frame discrimination unit 26.

The MPX 35 receives the quantization scale from the rate controller 34, valid/invalid frame information from the valid/invalid frame discrimination unit 26, valid/invalid block information from the valid/invalid block discrimination unit 29, and compressed data stored in the buffer 32 via the switch 33, re-arranges data in a predetermined bit stream, and outputs the bit stream to a transmission buffer 44 and the rate controller 34.

The bit stream stored in the transmission buffer 44 is output at a predetermined rate. The rate controller 34 counts the code amount of the bit stream as the output from the MPX 35, and predicts the quantization scale (quantization step size) of the next frame to be coded, so that the generated code amount becomes equal to or smaller than a predetermined bit rate. This quantization scale is input to the quantizer 36 and the inverse quantizer 39.

Upon repetition of the above-mentioned processing for one frame, a motion image signal is compressed with high efficiency. Since the motion image coding apparatus of the fourth embodiment can calculate an inter-frame difference absolute value sum, can perform valid/invalid frame discrimination, and at the same time, can parallelly process coding, the coding delay time can be shortened. In this embodiment, inter-frame prediction uses a simple inter-frame difference under the assumption that a change in motion between adjacent frames is negligible.

Figure 13:
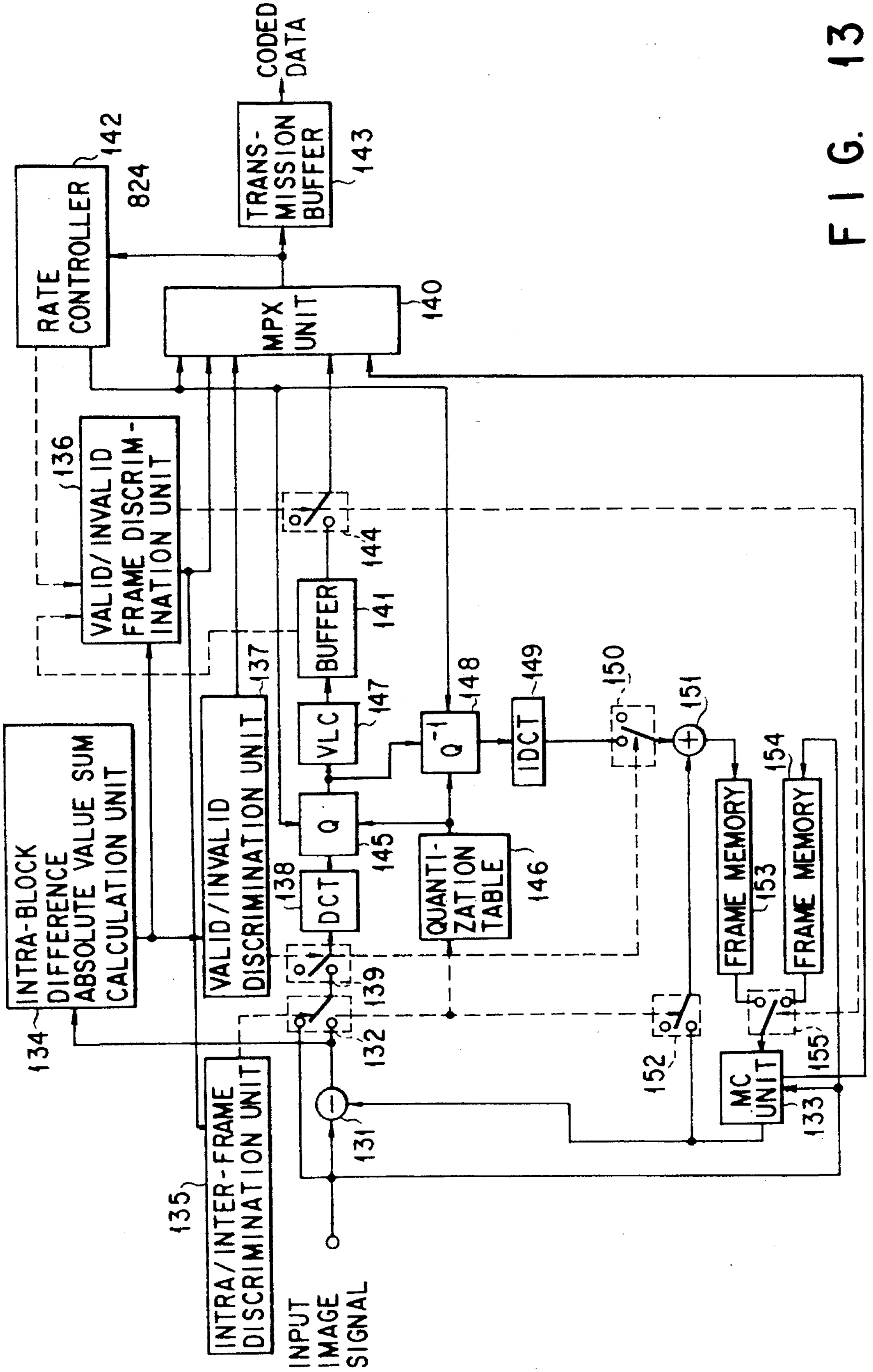
FIG. 13 is a block diagram showing a motion image coding apparatus according to the fifth embodiment of the present invention.

FIG. 13 shows the arrangement of a motion image coding apparatus according to the fifth embodiment of the present invention. The apparatus of the fifth embodiment will be described below.

In this motion image coding apparatus, an input image signal is input to a switch 132 in units of blocks (each consisting of, e.g., 8×8 pixels) directly and via a subtracter 131 in the form of difference data. The subtracter 131 receives, as the other input, motion-compensated predicted image data which is predicted using decoded image data of the previous frame or input image data of the previous frame as reference image data, and is output from a motion-compensated prediction (MC) unit 133. The subtracter 131 performs subtraction of the two data, and outputs motion-compensated predicted error data. The error data as the output from the subtracter 131 is output to an intra-block difference absolute value sum calculation unit 134 and to the switch 132.

An intra/inter-frame discrimination unit 135 controls the switch 132 to output the input image signal so as to perform intra-frame encoding, for the first frame input within a predetermined time period (e.g., ½ sec) or when the signal output from a valid/invalid frame discrimination unit 136 indicates an invalid frame. Otherwise, the unit 135 controls the switch 132 to output difference data from the subtracter 131.

The intra-block difference absolute value sum calculation unit 134 calculates the absolute value sum of the error data, and outputs it, as the difference absolute value sum, to a valid/invalid block discrimination unit 137 and the valid/invalid frame discrimination unit 136. Also, the unit 134 outputs an intra-block maximum absolute value of the error data to the valid/invalid block discrimination unit 137.

The valid/invalid block discrimination unit 137 respectively compares the input intra-block difference absolute value sum and the intra-block maximum absolute value with threshold values 1 and 2. When the intra-block difference absolute value sum≧threshold value 1, and the intra-block maximum absolute value≧threshold value 2, the unit 137 controls a switch 139, so that the output from the switch 132 is input to a DCT 138. When the intra-block difference absolute value sum<threshold value 1, or the intra-block maximum absolute value<threshold value 2, the unit 137 controls the switch 139, so that the output from the switch 132 is not input to the DCT 138. Also, the unit 137 sends valid/invalid block information to an MPX 140.

The valid/invalid frame discrimination unit 136 adds intra-block difference absolute value sums for one frame. When the intra-frame difference absolute value sum is equal to or larger than predetermined threshold value 3, or when the code amount for one frame stored in a buffer 141 is equal to or larger than threshold value 4, or when a rate controller 142 determines that a transmission buffer 143 overflows, the unit 136 controls to disconnect a switch 144, and outputs a symbol indicating an invalid frame to the intra/inter-frame discrimination unit 135 and the MPX 140. In this case, original image data (8×8 pixels) or inter-frame predicted error image data as the output from the switch 132 is input to the DCT 138, and is subjected to discrete cosine transform. The transformed data is output to a quantizer (Q) 145.

The quantizer 145 selectively receives one of two different quantization matrices (in each of which weighting coefficients corresponding to transform coefficients are aligned in a matrix) which are prestored in a quantization table 146, and are selected in accordance with a discrimination result (indicating intra- or inter-frame coding) from the intra/inter-frame discrimination unit 135. Furthermore, the quantizer 145 receives a quantization scale from the rate controller 142. The quantizer 145 multiplies the quantization matrix with the quantization scale to calculate a quantization step size of each transform coefficient, and quantizes each transform coefficient as an output from the DCT 138 using the calculated quantization step size.

The quantized transform coefficients are input to a variable length coder (VLC) 147 and an inverse quantizer ($Q_{-1}$) 148. The VLC 147 outputs, to the buffer 141, a Huffman code corresponding to a difference value from that in the previous block in correspondence with the DC component of the transform coefficients, and outputs, to the buffer 141, two-dimensional Huffman codes corresponding to zero runs and non-zero values immediately after the corresponding zero runs in correspondence with linear data obtained by zigzag-scanning AC components from a lower frequency component to a higher frequency component. When zeros continue to the end of a block, the VLC 147 outputs an EOB (End Of Block) code to the buffer 141.

The inverse quantizer 148 receives the same quantization matrix and quantization scale as those of the quantizer 145, generates a quantization step size, and restores transform coefficient values by multiplying each quantized value output from the quantizer 145 with the corresponding quantization step size (which may be directly received from the quantizer 145 since it is the same as that used in the quantizer 145). The inverse quantizer 148 then outputs the transform coefficient values to an IDCT 149.

The IDCT 149 performs inverse cosine transform of the inversely quantized transform coefficients to generate a decoded data block. The decoded data block is input to a switch 150, and is input to an adder 151 only when the valid/invalid block discrimination unit 137 determines a valid block. When the intra/inter-frame discrimination unit 135 selects intra-frame coding, the adder 151 receives zero by controlling a switch 152; when the unit 135 selects inter-frame coding, the adder 151 receives decoded image data of the previous frame by controlling the switch 152. The adder 151 adds the received data to generate decoded image data of the currently coded image signal, and stores the image data at the predetermined position of a frame memory 153. A frame memory 154 stores input image data without any modifications.

When the valid/invalid frame discrimination unit 136 discriminates a valid frame, a switch 155 is controlled to output decoded image data stored in the frame memory 153 to the MC unit 133; when the unit 136 discriminates an invalid frame, the switch 155 is controlled to output input image data of the previous frame stored in the frame memory 154 to the MC unit 133.

The MC unit 133 receives the input image block data of the current frame and the decoded image data or input image data of the previous frame via the switch 155, and calculates a motion vector by executing block matching between the input image block data of the current frame and the decoded image data or input image data of the previous frame as reference image data. The unit 133 extracts motion-compensated predicted block data from the reference image data on the basis of the calculated motion vector, and outputs the extracted block data to the subtracter 131 and the switch 152.

The buffer 141 stores variable length codes for one frame from the VLC 147, and outputs the stored code amount to the valid/invalid frame discrimination unit 136. As described above, the stored code amount is used in valid/invalid frame discrimination.

The MPX 140 receives the quantization scale from the rate controller 142, valid/invalid frame information from the valid/invalid frame discrimination unit 136, valid/invalid block information from the valid/invalid block discrimination unit 137, and variable length coded data for one frame stored in the buffer 141 via the switch 144, re-arranges these data in a predetermined bit stream syntax, and outputs the bit stream to the transmission buffer 143 and the rate controller 142.

The bit stream stored in the transmission buffer 143 is output at a predetermined rate. The rate controller 142 counts the code amount of the bit stream as the output from the MPX 140, and predicts the quantization scale of the next frame to be coded, so that the generated code amount becomes equal to or smaller than a predetermined average bit rate.

This prediction is independently performed in each of intra- and inter-frame coding modes.

Prediction formulas are as follows:

$$Q_s(I) = (\text{code amount } (I) \text{ to be assigned to next frame/generated code amount } (I) \text{ of current frame})^{1/2} \times Q_s'(I)$$

$$Q_s(P) = (\text{code amount } (P) \text{ to be assigned to next frame/generated code amount } (P) \text{ of current frame})^{1/2} \times Q_s'(P)$$

where $Q_s'$ (I) and $Q_s'$ (P) are the quantization scales respectively used in the current intra-coding frame and the inter-coding frames, and $Q_s$(I) and $Q_s$(P) are the quantization scales to be respectively used in the next intra- and inter-coding frames.

The quantization scale is input to the quantizer 145 and the inverse quantizer 148 to generate the quantization step size to be used for the next frame.

Upon repetition of the above-mentioned processing for one frame, a motion image signal is compressed with high efficiency.

As described above, even when motion compensation is performed between adjacent frames, since valid/invalid frame discrimination and coding can be parallelly processed, the coding delay time can be minimized.

Figure 14:
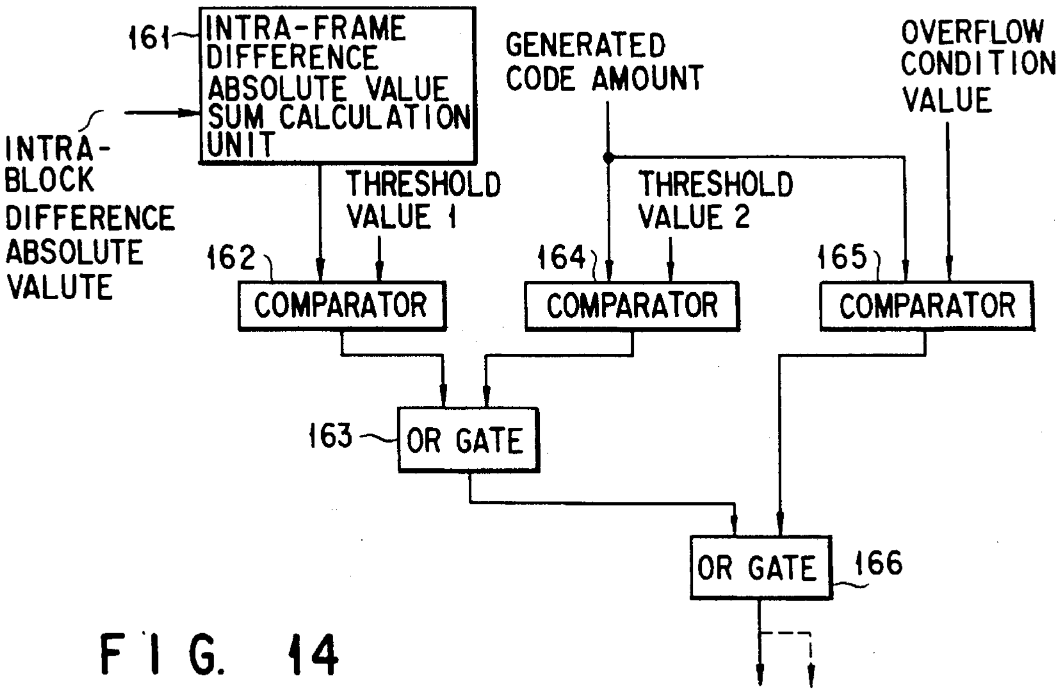
FIG. 14 is a block diagram showing the arrangement of a valid/invalid frame discrimination unit shown in FIGS. 12 and 13.

FIG. 14 shows the arrangement of the valid/invalid frame discrimination unit 26 of the fourth embodiment shown in FIG. 12 or the valid/invalid frame discrimination unit 136 of the fifth embodiment shown in FIG. 13.

The intra-block difference absolute value sum output from the above-mentioned intra-block difference absolute value sum calculation unit 28 or 134 is input to an infra-frame difference absolute value sum calculation unit 161. The infra-frame difference absolute value sum calculation unit 161 adds the intra-block difference absolute value sums for one frame to calculate an infra-frame difference absolute value sum. The intra-frame difference absolute value sum is compared with threshold value 1 by a comparator 162. When the sum is larger than threshold value 1, "1" is output to an OR gate 163; otherwise, "0" is output to the OR gate 163.

The generated code amount for one frame is output from the buffer 32 or 141, and is input to a comparator 164. The code amount is compared with threshold value 2. When the code amount is larger than threshold value 2, "1" is output to the OR gate 163; otherwise, "0" is output to the OR gate 163.

An overflow condition value is output from the rate controller 34 or 142, and is input to a comparator 165. On the other hand, the generated code amount output from the buffer 32 or 141 is input to the comparator 165. When the generated code amount is larger than the overflow condition value, "1" is output; otherwise, "0" is output.

The OR gate 163 receives the outputs from the comparators 162 and 164, and calculates and outputs an OR of the two inputs to an OR gate 166. On the other hand, the output from the comparator 165 is input to the OR gate 166. The OR gate 166 calculates an OR of the two inputs, and outputs the OR to the MPX 35 or 140, and to the switches 33 and 23 or 144 and 155 as a control signal.

Figure 15:
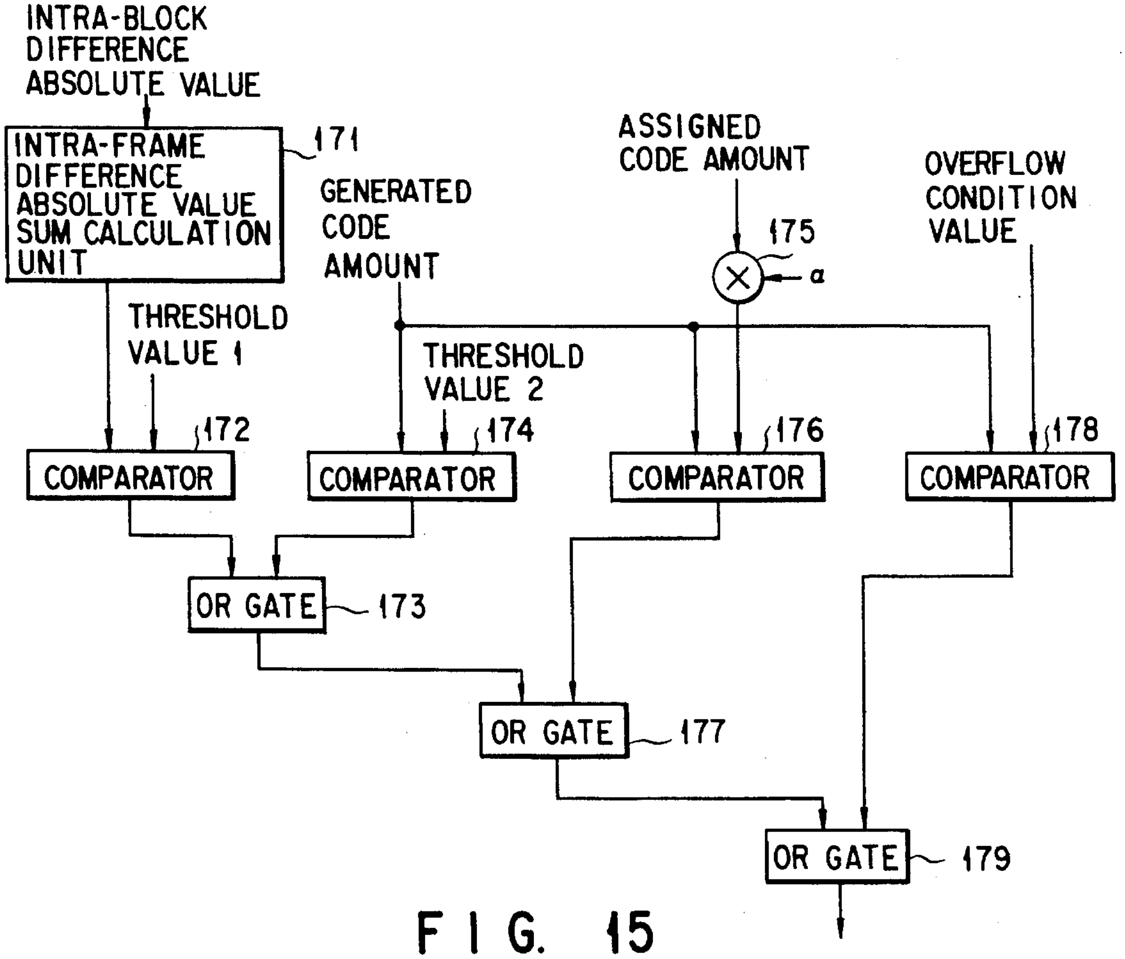
FIG. 15 is a block diagram showing another arrangement of the valid/invalid frame discrimination unit shown in FIGS. 12 and 13.

FIG. 15 shows another arrangement of the valid/invalid frame discrimination unit 26 or 136 shown in FIG. 12 or 13.

The intra-block difference absolute value output from the intra-block difference absolute value sum calculation unit 28 or 134 is input to an intra-frame difference absolute value sum calculation unit 171. The unit 171 calculates a sum of intra-block difference absolute values for one frame. The intra-frame difference absolute value sum is compared with threshold value 1 by a comparator 172. When the sum is larger than threshold value 1, "1" is output to an OR gate 173; otherwise, "0" is output to the OR gate 173.

The generated code amount for one frame is output from the buffer 32 or 141, and is input to a comparator 174. When the code amount is larger than threshold value 2, "1" is output to the OR gate 173; otherwise, "0" is output to the OR gate 173.

A code amount to be assigned to one frame is supplied from the rate controller 34 or 142 to a multiplier 175, and a product obtained by multiplying the code amount with a constant ° is output to a comparator 176.

The generated code amount for one frame output from the buffer 32 or 141 is also supplied to the comparator 176. When the generated code amount is larger than the assigned code amount ×α, "1" is output to an OR gate 177; otherwise, "0" is output to the OR gate 177.

Furthermore, an overflow condition value is output from the rate controller 34 or 142, and is supplied to a comparator 178. The generated code amount output from the buffer 32 or 141 is also supplied to the comparator 178. When the generated code amount is larger than the overflow condition value, "1" is output to an OR gate 179; otherwise, "0" is output to the OR gate 179.

The OR gate 173 receives the outputs from the comparators 172 and 174, and calculates and outputs an OR of the two inputs to the OR gate 177. The OR gate 177 receives the output from the comparator 176, and calculates and outputs an OR of the two inputs to the 0R gate 179. The OR gate 179 receives the output from the comparator 178, and calculates and outputs an OR of the two inputs to the MPX 35 or 140, and to the switches 33 and 23 or 144 and 155 as a control signal.

With this arrangement, when it is determined that the intra-frame difference absolute value sum is equal to or smaller than threshold value 1, and a code amount larger than the assigned code amount×α is generated, the corresponding frame is determined to be an invalid frame when the frame has a generated code amount larger than the assigned code amount×α (for example, α is a constant equal to or larger than 2), so as to prevent the code amount to be assigned to the subsequent frames from becoming too small.

A pre-set value of a quantization scale to be used upon execution of the first inter-frame coding and intra-frame coding after an invalid frame is compared with the predicted quantization scale. When the predicted quantization scale is smaller than the pre-set value, the quantization scale to be actually used is reset to the pre-set value (this resetting operation is processed inside the rate controller 34 or 142), and a signal indicating a valid or invalid frame from the valid/invalid frame discrimination unit 26 or 136 is input to the rate controller 34 or 142.

Since the generated code amount can be prevented from being unnecessarily increased, and a sufficient code amount can be assigned to the subsequent frames, deterioration of image quality can be prevented.

In the motion image coding apparatus with the above-mentioned arrangement, upon execution of orthogonal transform by means of orthogonal transform, quantization, and variable length coding, and upon execution of coding by means of quantization and variable length coding, the statistical value of inter-frame predicted errors can be calculated, and the capacity of a buffer memory for storing coded data can be smaller than that of a buffer memory used for delaying a one-frame period. Therefore, deterioration of image quality after a scene change can be suppressed while minimizing the coding delay time and the hardware scale.

Although not shown in FIGS. 12 and 13, the generated code amounts of coded frames with respect to interframe predicted error signals can be further effectively averaged by adopting the same technique as in the first and second embodiments.

As described in detail above, according to the motion image coding apparatus of the fourth and fifth embodiments of the present invention, a motion image coding apparatus, which can prevent deterioration of image quality after a scene change by effectively selecting whether or not coded data is used, parallel to actual coding before the scene change, can be provided.

The sixth to ninth embodiments of the present invention will be described in detail below with reference to the accompanying drawings.

Figure 16:
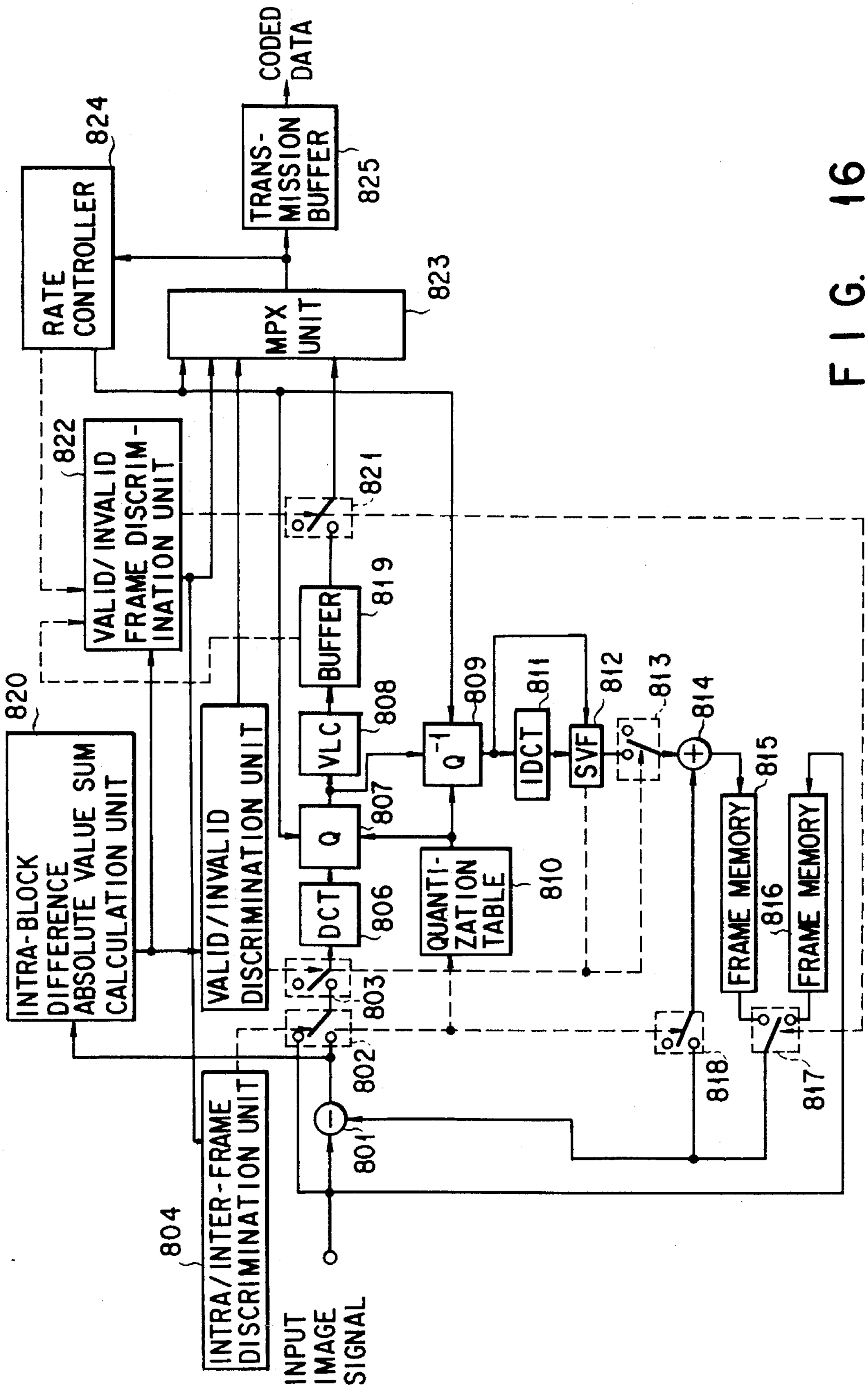
FIG. 16 is a block diagram showing a motion image coding apparatus according to the sixth embodiment of the present invention.

FIG. 16 shows the arrangement of a motion image coding apparatus according to the sixth embodiment of the present invention. The apparatus of the sixth embodiment will be described below.

In this motion image coding apparatus, an input image signal is input to a switch 802 in units of blocks (each consisting of, e.g., 8×8 pixels) directly and via a subtracter 801 in the form of difference data.

The subtracter 801 receives, as the other input via a switch 817, one of a decoded image signal of the previous frame stored in a frame memory 815, and an original image signal of the previous frame stored in a frame memory 816, which is selected under the control of a valid/invalid frame discrimination unit 822 (when the unit 822 discriminates a valid frame, the decoded image signal of the previous frame is selected; when the unit 822 discriminates an invalid frame, the original image signal of the previous frame is selected).

An intra/inter-frame discrimination unit 804 controls the switch 802 to output the input image signal so as to perform intra-frame encoding, for the first frame input within a predetermined time period (e.g., ½ sec) or when the signal output from the valid/invalid frame discrimination unit 822 indicates an invalid frame. Otherwise, the unit 804 controls the switch 802 to output difference data from the subtracter 801.

The difference data as the output from the subtracter 801 is input to an intra-block difference absolute value sum calculation unit 820 to calculate the absolute value sum of the difference data. The difference absolute value sum is input to a valid/invalid block discrimination unit 805 and the valid/invalid frame discrimination unit 822.

The valid/invalid block discrimination unit 805 compares the input intra-block difference absolute value sum with predetermined threshold value 1. When the sum is equal to or larger than threshold value 1, the unit 805 controls a switch 803, so that the output from the switch 802 is input to a DCT 806. When the sum is smaller than threshold value 1, the unit 805 controls the switch 803, so that the output from the switch 802 is not input to the DCT 806. The valid/invalid frame discrimination unit 822 adds intra-block difference absolute value sums for one frame to obtain an intra-frame difference absolute value sum. When the intra-frame difference absolute value sum is equal to or larger than predetermined threshold value 2, or when the code amount stored in a buffer 819 is equal to or larger than threshold value 3, and when a rate controller 824 determines that a transmission buffer 825 overflows, the unit 822 determines that the corresponding frame is an invalid frame, and controls to disconnect a switch 821. Otherwise, the unit 822 determines that the corresponding frame is a valid frame, and controls to connect the switch 821.

Also, the valid/invalid block discrimination unit 805 outputs 1-bit information per block indicating a valid or invalid block to an MPX 823. Furthermore, the valid/invalid frame discrimination unit 822 outputs 1-bit information per frame indicating a valid or invalid frame to the MPX 823.

An original image signal of 8×8 pixels or an inter-frame difference image signal as an output from the switch 803 is input to the DCT 806, and is subjected to discrete cosine transform. The transformed data is input to a quantizer (Q) 807. The quantizer 807 selectively receives one of two different quantization matrices (in each of which weighting coefficients corresponding to transform coefficients are aligned in a matrix) which are pre-stored in a quantization table 810, and are selected in accordance with a discrimination result (indicating intra- or inter-frame coding) from the intra/inter-frame discrimination unit 804. Furthermore, the quantizer 807 receives a quantization scale from the rate controller 824. The quantizer 807 multiplies the quantization matrix with the quantization scale to calculate a quantization step size of each transform coefficient, and quantizes each transform coefficient as an output from the DCT 806 using the calculated quantization step size.

The quantized transform coefficients are input to a variable length coder (VLC) 808 and an inverse quantizer ($Q^{-1}$) 809. The VLC 808 outputs a Huffman code corresponding to a difference value from that in the previous block in correspondence with the DC component of the transform coefficients, and outputs two-dimensional Huffman codes corresponding to zero runs and non-values immediately after the corresponding zero runs in correspondence with linear data obtained by zigzag-scanning AC components from a lower frequency component to a higher frequency component. When zeros continue to the end of a block, the VLC 808 outputs an EOB (End Of Block) code. The inverse quantizer 809 receives the same quantization matrix and quantization scale as those of the quantizer 807, generates a quantization step size, and generates inversely quantized transform coefficients by multiplying each quantized value with the corresponding quantization step size. The inverse quantizer 809 then outputs the inversely quantized transform coefficients to an IDCT 811 and an SVF (Space valiant Filter) 812.

The IDCT 811 performs inverse cosine transform of the inversely quantized transform coefficients to generate a decoded data block. The decoded data block is input to the SVF 812.

Figure 17:
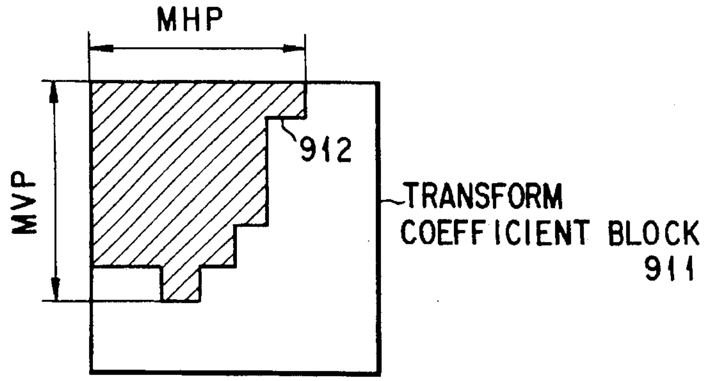
FIG. 17 is a view showing the relationship between positions MHP and MVP of highest frequency components of inversely quantized transform coefficient values.
Figure 18A:
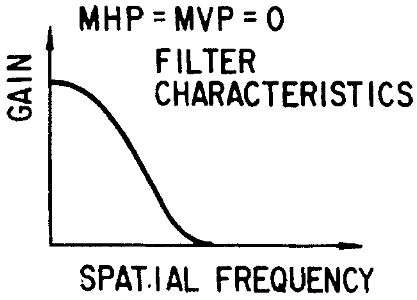
FIGS. 18A to 18E are graphs showing the filter characteristics of a low-pass filter.
Figure 18B:
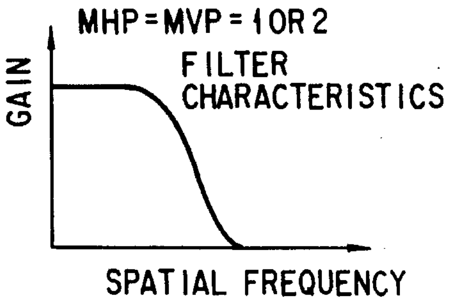
Figure 18C:
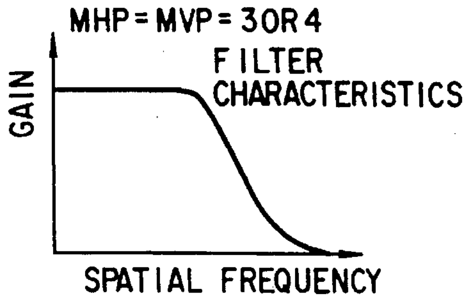
Figure 18D:
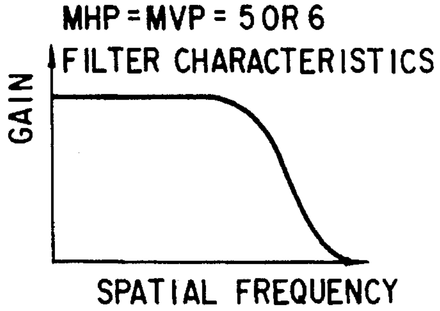
Figure 18E:
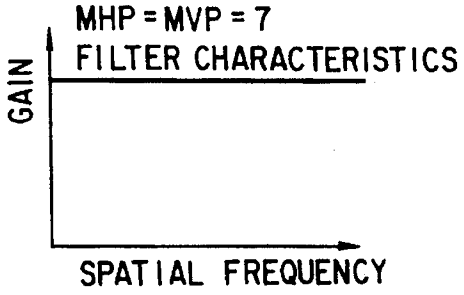

The SVF 812 detects positions MHP and MVP of non-zero highest frequency components in the horizontal and vertical directions of the inversely quantized transform coefficient values as the inputs from the inverse quantizer 809, as shown in FIG. 17, and selects at least one of a plurality of low-pass filters prepared in the horizontal and vertical directions and having different characteristics, as shown in FIGS. 18A to 18E, using the positions MHP and MVP as parameters. The SVF 812 records the selected numbers in a memory.

The decoded image block input from the IDCT 811 is stored in a buffer memory (not shown) in the SVF 812. When four blocks, i.e., upper, lower, right, and left blocks, adjacent to a block of interest are stored in the buffer memory, the selected low-pass filters in the horizontal and vertical directions are applied to the boundary data of the block of interest and data inside the block.

In the case of an ultrasonic diagnostic image, only the filter in the horizontal direction is sufficiently effective. Also, the filter characteristics may be changed from the block boundary toward the center.

The decoded data block subjected to the low-pass filter processing is input to a switch 813. Only when the valid/invalid block discrimination unit 805 discriminates a valid block, the decoded data block is input to an adder 814. The adder 814 receives zero by controlling a switch 818 when the intra/inter-frame discrimination unit 804 selects intra-frame coding; the adder 814 receives the decoded image signal of the previous frame by controlling the switch 818 when the unit 804 selects inter-frame coding.

The two data input to the adder 814 are added to each other to generate a decoded image signal of the currently coded image, and the decoded image signal is stored in the frame memory 815. The frame memory 816 stores original image data without any modifications.

When the valid/invalid frame discrimination unit 822 discriminates a valid frame, the switch 817 is controlled to output the decoded image signal stored in the frame memory 815 to the subtracter 801 and the switch 818; when the unit 822 discriminates an invalid frame, the switch 817 is switched to output the original image signal stored in the frame memory 816 to the subtracter 801 and the switch 818.

The buffer 819 stores variable length coded data for one frame, and outputs the data amount of the stored codes to the valid/invalid frame discrimination unit 822.

The MPX 823 receives the quantization scale from the rate controller 824, valid/invalid frame information from the valid/invalid frame discrimination unit 822, valid/invalid block information from the valid/invalid block discrimination unit 805, and compressed data stored in the buffer 819 via the switch 821, re-arranges these data in a predetermined bit stream, and outputs the bit stream to the transmission buffer 825 and the rate controller 824.

The bit stream stored in the transmission buffer 825 is output at a predetermined rate. The rate controller 824 counts the code amount of the bit stream as the output from the MPX 823, and predicts the quantization scale (quantization step size) of the next frame to be coded, so that the generated code amount becomes equal to or smaller than a predetermined average bit rate. This prediction is independently performed in each of intra- and inter-frame coding modes.

Prediction formulas are as follows:

$$Q_s(I) = (\text{code amount } (I) \text{ to be assigned to next frame/generated code amount } (I) \text{ of current frame})^{1/2} \times Q_s'(I)$$

$$Q_s(P) = (\text{code amount } (P) \text{ to be assigned to next frame/generated code amount } (P) \text{ of current frame})^{1/2} \times Q_s'(P)$$

where $Q_s'$ (I) and $Q_s'$ (P) are the quantization scales respectively used in the current intra- and inter-coding frames, and $Q_s$(I) and $Q_s$(P) are the quantization scales to be respectively used in the next intra- and inter-coding frames.

This quantization scale is input to the quantizer 807 and the inverse quantizer 809 to generate a quantization step size used for the next frame.

Upon repetition of the above-mentioned processing for one frame, a motion image signal is compressed with high efficiency. According to this embodiment, since a discontinuous distortion (block distortion) generated at a boundary adjacent to the decoded data block as the output result from the IDCT 811 can be eliminated, generation of a block distortion in the decoded image as the output from the adder 814 can be suppressed. In the sixth embodiment, inter-frame prediction uses a simple inter-frame difference.

Figure 19:
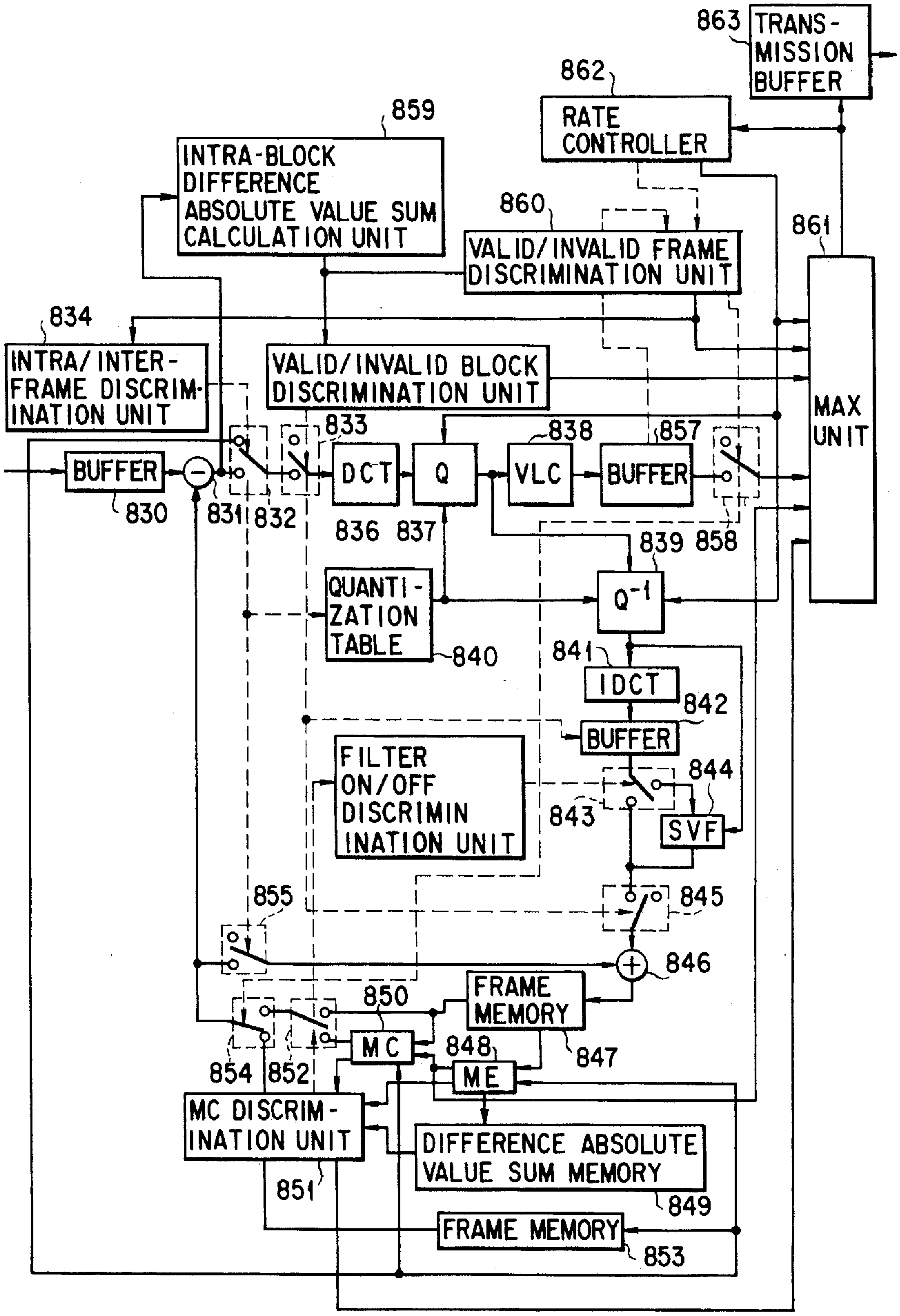
FIG. 19 is a block diagram showing a motion image coding apparatus according to the seventh embodiment of the present invention.

FIG. 19 shows the arrangement of a motion image coding apparatus according to the seventh embodiment of the present invention.

In this motion image coding apparatus, an input image signal is written in a buffer 830, and after an elapse of a predetermined period of time, the input image signal is input to a switch 832 in units of blocks (each consisting of, e.g., 8×8 blocks) directly and via a subtracter 831 as difference data.

The subtracter 831 receives, as the other input via a switch 854, one of a decoded image signal of the previous frame stored in a frame memory 847 and an input original image signal of the previous frame stored in a frame memory 853, which are selected under the control of a valid/invalid frame discrimination unit 860. In this case, when the unit 860 discriminates a valid frame, the decoded image signal of the previous frame is selected; when the unit 860 discriminates an invalid frame, the original image signal of the previous frame is selected.

An intra/inter-frame discrimination unit 834 controls the switch 832 to output the input image signal so as to perform intra-frame encoding, for the first frame input within a predetermined time period (e.g., ½ sec) or when the signal output from the valid/invalid frame discrimination unit 860 indicates an invalid frame. Otherwise, the unit 834 controls the switch 832 to output difference data from the subtracter 831.

The difference data as the output from the subtracter 831 is input to an intra-block difference absolute value sum calculation unit 859 to calculate the absolute value sum of the difference data. The difference absolute value sum is input to a valid/invalid block discrimination unit 835 and the valid/invalid frame discrimination unit 860.

The valid/invalid block discrimination unit 835 compares the input intra-block difference absolute value sum with predetermined threshold value 1. When the sum is equal to or larger than threshold value 1, the unit 835 controls a switch 833, so that the output from the switch 832 is input to a DCT 836. When the sum is smaller than threshold value 1, the unit 835 controls the switch 833, so that the output from the switch 832 is not input to the DCT 836. The valid/invalid frame discrimination unit 860 adds intra-block difference absolute value sums for one frame to obtain an intra-frame difference absolute value sum. When the intra-frame difference absolute value sum is equal to or larger than predetermined threshold value 2, or when the code amount stored in a buffer 857 is equal to or larger than threshold value 3, and when a rate controller 862 determines that a transmission buffer 863 overflows, the unit 860 determines that the corresponding frame is an invalid frame, and controls to disconnect a switch 858. Otherwise, the unit 822 controls to connect the switch 858.

Also, the valid/invalid block discrimination unit 835 outputs 1-bit information per block indicating a valid or invalid block to an MPX 861. Furthermore, the valid/invalid frame discrimination unit 860 outputs 1-bit information per frame indicating a valid or invalid frame to the MPX 861.

An original image signal of 8×8 pixels or an inter-frame difference image signal as an output from the switch 832 is input to the DCT 836, and is subjected to discrete cosine transform. The transformed data is input to a quantizer (Q) 837. The quantizer 837 selectively receives one of two different quantization matrices (in each of which weighting coefficients corresponding to transform coefficients are aligned in a matrix) which are pre-stored in a quantization table 840, and are selected in accordance with a discrimination result (indicating intra- or inter-frame coding) from the intra/inter-frame discrimination unit 834. Furthermore, the quantizer 837 receives a quantization scale from the rate controller 862. The quantizer 837 multiplies the quantization matrix with the quantization scale to calculate a quantization step size of each transform coefficient, and quantizes each transform coefficient as an output from the DCT 836 using the calculated quantization step size.

The quantized transform coefficients are input to a variable length coder (VLC) 838 and an inverse quantizer ($Q^{-1}$) 839. The VLC 838 outputs, to the buffer 857, a Huffman code corresponding to a difference value from that in the previous block in correspondence with the DC component of the transform coefficients, and outputs, to the buffer 857, two-dimensional Huffman codes corresponding to zero runs and non-values immediately after the corresponding zero runs in correspondence with linear data obtained by zigzag-scanning AC components from a lower frequency component to a higher frequency component. When zeros continue to the end of a block, the VLC 838 outputs an EOB (End Of Block) code. The inverse quantizer 839 receives the same quantization matrix and quantization scale as those of the quantizer 837, generates a quantization step size, and generates inversely quantized transform coefficients by multiplying each quantized value with the corresponding quantization step size. The inverse quantizer 839 then outputs the inversely quantized transform coefficients to an IDCT 841 and an SVF (Space Valiant Filter) 844.

The IDCT 841 performs inverse cosine transform of the inversely quantized transform coefficients to generate a decoded data block. Data of a predetermined number of blocks are stored in a buffer 842. The predetermined number of blocks corresponds to the number of block data required in the SVF 844. For example, when the SVF 844 performs filtering in only the horizontal direction, three continuous blocks in the horizontal direction need only be stored. When the SVF 844 performs filtering in both the horizontal and vertical directions, two block lines+one block must be stored. (At an invalid block position, "0"s corresponding to the number of pixels in a block are stored).

A block to be processed of decoded data stored in the buffer 842 is supplied to a switch 843. When a filter ON mode is determined under the control of a filter ON/OFF discrimination unit 856, the data is output from the switch 843 to the SVF 844. When a filter OFF mode is determined, the data is directly output to a switch 845.

The SVF 844 detects positions MHP and MVP (FIG. 17) of non-zero highest frequency components in the horizontal and vertical directions of the inversely quantized transform coefficient values as the inputs from the inverse quantizer 839, and selects a plurality of low-pass filters (FIGS. 18A to 18E) prepared in the horizontal and vertical directions and having different characteristics, using the positions MHP and MVP as parameters. The SVF 844 records the selected numbers in a memory. In this case, a DC component is selected as the highest frequency positions of an invalid block, i.e., (MHP=MVP=O) is selected.

Then, the low-pass filters according to the selected numbers of the filters are applied to block boundary data and data in the decoded data block input from the buffer 842 via the switch 843. The decoded data block subjected to the filter processing is output to the switch 845, and is then input to an adder 846 only when the valid/invalid block discrimination unit 835 discriminates a valid block. The adder 846 receives "0" by controlling a switch 855 when the intra/inter-frame discrimination unit 834 selects intra-frame coding; the adder 846 receives the decoded image signal of the previous frame by controlling the switch 855 when the unit 834 selects inter-frame coding. The adder 846 adds the two input data to generate a decoded image signal of the currently coded image, and rewrites the contents (decoded image data of the previous frame) at the predetermined position of the frame memory 847 with the generated decoded image signal. The frame memory 853 stores original image data without any modifications.

Figure 22:
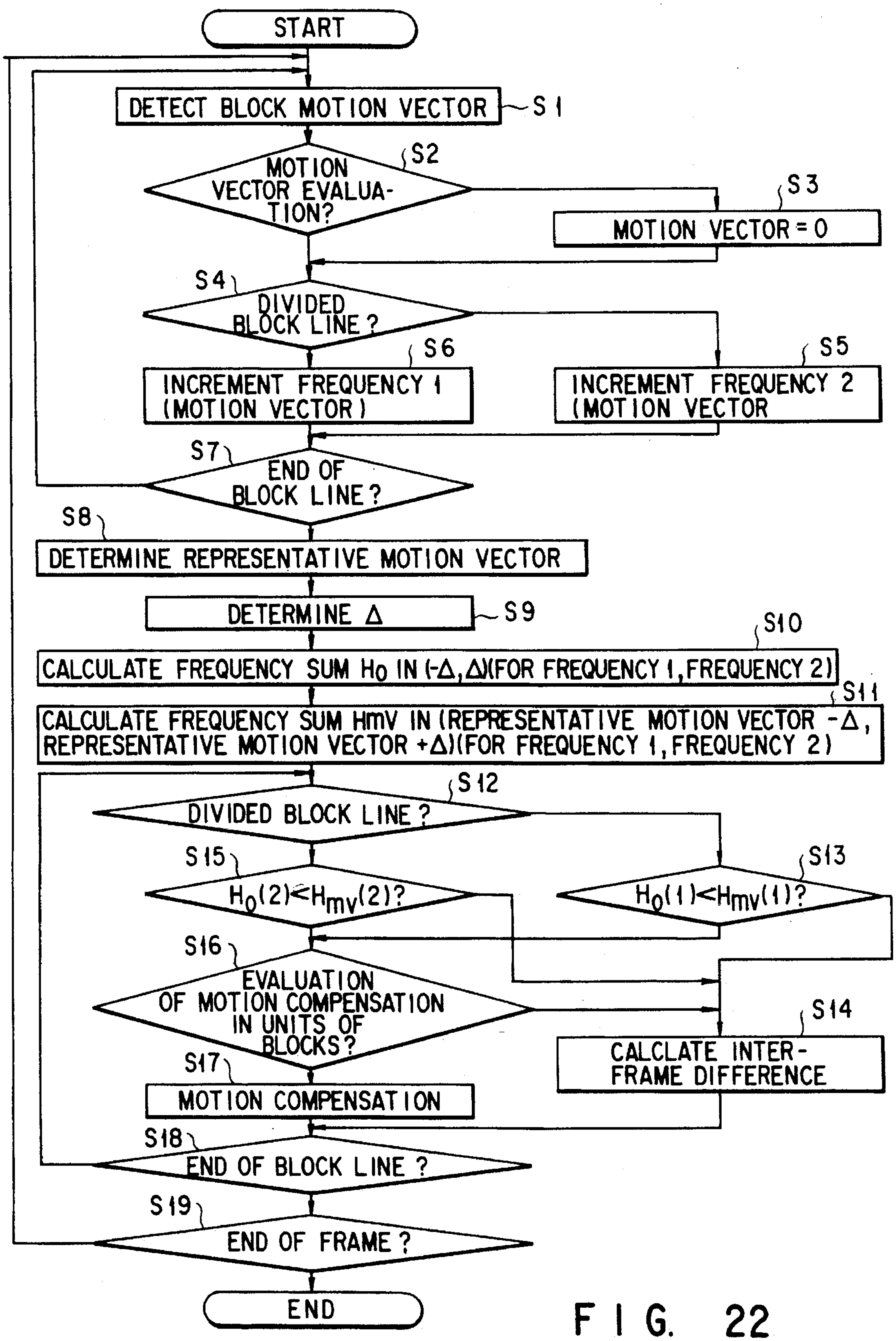
FIG. 22 is a flow chart for explaining motion detection and motion compensation.

FIG. 22 is a flow chart showing motion detection (estimation) and motion compensation.

A motion estimation (ME) unit 848 receives original image data, and decoded image data of the previous frame stored in the frame memory 847, and performs motion detection (step S1).

The motion detection is performed for a search area within a range of±d pixels, around the same positions as an original image data block, of decoded image data of the previous frame with respect to an n×m pixel block (e.g., 8×8 pixels) of the original image data (when this technique is used for an ultrasonic diagnostic image, a range of ±d pixels in the horizontal direction is used).

The discrimination criterion of a motion vector to be obtained is a position when the difference absolute value sum between original image data and decoded image data of the previous frame is minimum, and the difference absolute value sum is smaller than (the difference absolute value sum at the position of a motion vector=0)×α. When this condition is not satisfied (NO), a motion vector is set to "0" (steps S2 and S3). When a motion vector is to be calculated up to a position with a 1-pixel precision or less, an interpolated image at the corresponding position is generated from the decoded image signal of the previous frame, and the difference absolute value sum is similarly calculated. As shown in FIGS. 20A and 20B, α is a constant larger than 1, a frequency in one block line is calculated for motion vectors of each block, and a motion vector having a maximum frequency other than zero is determined to be a representative motion vector in the corresponding block line (steps S4 to S8).

The representative motion vector is output to a motion compensated predictor (MC) unit 850 and the MPX 861. A difference absolute value sum memory 849 stores a difference absolute value sum of a motion vector=0 which is output from the ME unit 848.

Furthermore, a block line is divided into a plurality of lines (divided into two lines for an ultrasonic diagnostic image), and motion vector frequencies are calculated in units of divided block lines (steps S4 to S6). Furthermore, frequencies are re-calculated within ranges of [−Δ, Δ] and [representative motion vector−Δ, representative motion vector+Δ] with respect to the frequency distribution calculated in steps S4 to S6. In this case, A is a constant satisfying Δ≦|representative motion vector/2|, and [−a, b]represents a region which includes −a but excludes b (steps S9 to S11).

The two frequencies in each divided block line region are represented by $H_0(n)$ and $H_{mv}(n)$ (where n is the index indicating the position of a divided block line shown in FIGS. 21A to 21C) (step S12).

When these frequencies satisfy $H_0(n)<H_{mv}(n)$, motion compensation in this divided block line is permitted; otherwise, motion compensation is inhibited. This signal is output to an MC discrimination unit 851.

The MC unit 850 reads decoded image data of the previous frame in the frame memory 847 in accordance with the representative motion vector data from the ME unit 848 to generate a motion-compensated predicted image block, and outputs it to a switch 852. Also, the unit 850 calculates a difference absolute value sum (MC error absolute value sum) between the original image data and the motion-compensated predicted image block, and outputs it to the MC discrimination unit 851. Furthermore, the difference absolute value sum memory 849 outputs a difference absolute value sum (0) at the same block position to the MC discrimination unit 851 (steps S13 and S14).

The MC discrimination unit 851 discriminates that motion compensation of a block satisfying the MC error absolute value sum<the difference absolute value sum (0)×β is performed only when it receives a signal for permitting motion compensation in the corresponding divided block line from the ME unit 848. The unit 851 outputs a signal indicating the ON/OFF state of motion compensation to the switch 852 as a control signal, and to the filter ON/OFF discrimination unit 856 and the MPX 861.

The switch 852 receives the decoded image data of the previous frame in the frame memory 847 and the motion-compensated predicted image data from the MC unit 850. When the MC discrimination unit 851 discriminates that motion compensation is ON, the motion-compensated predicted image data from the MC unit 850 is output to the switch 854; when the MC discrimination unit 851 discriminates that motion compensation is OFF, the decoded image data of the previous frame in the frame memory 847 is output to the switch 854 (steps S16 and S17).

The other input of the switch 854 receives original image data of the previous frame stored in the frame memory 853. When the control signal from the valid/invalid frame discrimination unit 860 indicates a valid frame (with respect to the previous frame), the input from the switch 852 is output from the switch 854; when the control signal indicates an invalid frame (with respect to the previous frame), the input from the frame memory 853 is output from the switch 854. This output is supplied to the subtracter 831 and the switch 855 (steps S18 and S19).

The filter ON/OFF discrimination unit 856 can store the output from the MC discrimination unit 851 for several blocks. When the stored MC discrimination state of the previous block is the same as that of the current block, the unit 856 controls the switch 843 to apply a filter to the boundary between these two blocks. When the MC discrimination state of the previous block is different from that of the current block, the unit 856 controls the switch 843 not to apply a filter.

The buffer 857 stores variable length coded data for one frame, and outputs the data amount of the stored codes to the valid/invalid frame discrimination unit 860.

The MPX 861 receives the quantization scale from the rate controller 862, valid/invalid frame information from the valid/invalid frame discrimination unit 860, valid/invalid block information from the valid/invalid block discrimination unit 835, compressed data stored in the buffer 857 via the switch 858, the block line representative motion vector data from the ME unit 848, and MC ON/OFF block information from the MC discrimination unit 851, re-arranges these data in a predetermined bit stream, and outputs the bit stream to the transmission buffer 863 and the rate controller 862.

The bit stream stored in the transmission buffer 863 is output at a predetermined rate. The rate controller 862 counts the code amount of the bit stream as the output from the MPX 861, and predicts the quantization scale (quantization step size) of the next frame to be coded, so that the generated code amount becomes equal to or smaller than a predetermined average bit rate. This prediction is independently performed in each of intra- and inter-frame coding modes.

Prediction formulas are as follows:

$$Q_s(I) = (\text{code amount } (I) \text{ to be assigned to next frame/generated code amount } (I) \text{ of current frame})^{1/2} \times Q_s'(I)$$

$$Q_s(P) = (\text{code amount } (P) \text{ to be assigned to next frame/generated code amount } (P) \text{ of current frame})^{1/2} \times Q_s'(P)$$

where $Q_s'$ (I) and $Q_s'$ (P) are the quantization scales respectively used in the current intra- and inter-coding frames, and $Q_s$(I) and $Q_s$(P) are the quantization scales to be respectively used in the next intra- and inter-coding frames.

This quantization scale is input to the quantizer 837 and the inverse quantizer 839 to generate a quantization step size used for the next frame.

In this embodiment, whether or not the SVF 844 is operated is controlled by the switch 843. Alternatively, the signal from the filter ON/OFF discrimination unit 856 may be directly input to the SVF 844, and in the filter OFF mode, the filter characteristics may be forcibly set in a state of MHP=MVP=7, as shown in FIGS. 18A to 18E, thus obtaining the same effect as in the above embodiment.

Upon repetition of the above-mentioned processing for one frame, a motion image signal is compressed with high efficiency. According to this embodiment, the motion of a graph portion, which is often observed in an ultrasonic diagnostic image, and uniformly moves in the horizontal direction, can be efficiently compensated, and compression efficiency can be improved.

When a block boundary is originally discontinuous (not caused by a quantization error), the SVF 844 may eliminate this discontinuity. When motion compensation is independently performed in units of block, a block boundary of the motion-compensated predicted error may become discontinuous with a very high possibility. For this reason, when motion compensation is performed together with the SVF, deterioration at the block boundary occurs. This problem can be greatly eliminated by block line representative motion vector data, motion compensation permission/inhibition discrimination in a divided block line, and processing for inhibiting filtering at a boundary between adjacent blocks having different motion compensation states (ON/OFF).

In this embodiment, valid/invalid block discrimination and motion-compensated prediction ON/OFF discrimination are performed by separate arrangements. However, the functions of the valid/invalid block discrimination unit 835 and the intra-block difference absolute value sum calculation unit 859 may be provided to the MC discrimination unit 851. In this case, the MC discrimination unit 851 further outputs valid/invalid block information, and an intra-block difference absolute value sum.

FIG. 23 shows the arrangement of a motion image coding apparatus according to the eighth embodiment of the present invention. The apparatus of the eighth embodiment will be described below.

In this motion image coding apparatus, an input image signal is written in a buffer 870, and after an elapse of a predetermined period of time, the input image signal is input to a switch 872 in units of blocks (each consisting of, e.g., 8×8 blocks) directly and via a subtracter 871 in the form of difference data.

The subtracter 871 receives, as the other input via a switch 892, one of a decoded image block of the previous frame, an input original image block of the previous block, and a motion-compensated predicted image block obtained using these image blocks as reference image data, and calculates difference data. This difference data is output to an intra-block difference absolute value sum calculation unit 899 and the switch 872.

An intra/inter-frame discrimination unit 874 controls the switch 872 to output the input original image block so as to perform intra-frame encoding, for the first frame input within a predetermined time period (e.g., ½ sec) or when the signal output from a valid/invalid frame discrimination unit 900 indicates an invalid frame. Otherwise, the unit 874 controls the switch 872 to output a difference data block from the subtracter 871.

The intra-block difference absolute value sum calculation unit 899 calculates the absolute value sum of input difference data, and the intra-block difference absolute value sum is output to a valid/invalid block discrimination unit 875 and to the valid/invalid frame discrimination unit 900. A maximum value of the intra-block difference absolute values is output to the valid/invalid block discrimination unit 875.

The valid/invalid block discrimination unit 875 respectively compares the input intra-block difference absolute value sum and intra-block maximum difference absolute value with threshold values 1 and 2.

More specifically, when the intra-block difference absolute value sum>threshold value 1, or when the and intra-block maximum difference absolute value>threshold value 2, the unit 875 switches a switch 873, so that the output from the switch 872 is supplied to a DCT 876; otherwise, the unit 875 switches the switch 873, so that the output from the switch 872 is not supplied to the DCT 876.

The valid/invalid frame discrimination unit 900 adds intra-block difference absolute value sums for one frame to obtain an intra-frame difference absolute value sum. When the intra-frame difference absolute value sum is equal to or larger than threshold value 3, or when a code amount stored in an input buffer 897 is equal to or larger than threshold value 4, and when a rate controller 902 discriminates that a transmission buffer 903 overflows, the unit 900 determines that the corresponding frame is an invalid frame, and controls to disconnect a switch 898; otherwise, the unit 900 controls to connect the switch 898.

The valid/invalid block discrimination unit 875 outputs 1-bit information per block which indicates if a block discriminated by the unit 875 is a valid or invalid block to an MPX 901. Furthermore, the valid/invalid frame discrimination unit 900 outputs 1-bit information per frame which indicates that a discriminated frame is a valid or invalid frame to the MPX 901.

Original image data of 8×8 pixels or inter-frame predicted error image data (the difference data) as an output from the switch 873 is input to the DCT 876, and is subjected to discrete cosine transform. The transformed data is input to a quantizer (Q) 877. The quantizer 877 selectively receives one of two different quantization matrices (in each of which weighting coefficients corresponding to transform coefficients are aligned in a matrix) which are pre-stored in a quantization table 880, and are selected in accordance with a discrimination result (indicating intra- or inter-frame coding) from the intra/inter-frame discrimination unit 874. Furthermore, the quantizer 877 receives a quantization scale from the rate controller 902. The quantizer 877 multiplies the quantization matrix with the quantization scale to calculate a quantization step size of each transform coefficient, and quantizes each transform coefficient as an output from the DCT 876 using the calculated quantization step size.

The quantized transform coefficients are input to a variable length coder (VLC) 878 and an inverse quantizer ($Q^{-1}$) 879. The VLC 878 outputs, to the buffer 897, a Huffman code corresponding to a difference value from that in the previous block in correspondence with the DC component of the transform coefficients, and outputs, to the buffer 897, two-dimensional Huffman codes corresponding to zero runs and non-values immediately after the corresponding zero runs in correspondence with linear data obtained by zigzag-scanning AC components from a lower frequency component to a higher frequency component. Furthermore, when zeros continue to the end of a block, the VLC 878 outputs an EOB (End Of Block) code to the buffer 897.

The inverse quantizer 879 receives the same quantization matrix and quantization scale as those of the quantizer 877, generates inversely quantized transform coefficients, and outputs the inversely quantized transform coefficients to an IDCT 881 and an SVF (Space Valiant Filter) 884. The IDCT 881 performs inverse cosine transform of the inversely quantized transform coefficients to generate a decoded data block. This data is stored in a buffer 882 for a predetermined number of blocks. The predetermined number of blocks corresponds to the number of block data required in the SVF 884. For example, when the SVF 884 performs filtering in only the horizontal direction, three continuous blocks in the horizontal direction need only be stored. When the SVF 884 performs filtering in both the horizontal and vertical directions, two block lines+one block must be stored. When a symbol indicating an invalid block is supplied from the valid/invalid block discrimination unit 875, "0"s are stored at the block position in correspondence with the number of pixels in the block.

A block to be processed of decoded data stored in the buffer 882 is supplied to a switch 883. When a filter ON mode is determined under the control of a filter ON/OFF discrimination unit 896, the data is output to the SVF 884. When a filter OFF mode is determined, the data is directly output to a switch 885.

The SVF 884 detects positions MHP and MVP (FIG. 17) of non-zero highest frequency components in the horizontal and vertical directions of the inversely quantized transform coefficient values as the inputs from the inverse quantizer 879, and selects a plurality of low-pass filters (FIGS. 18A to 18E) prepared in the horizontal and vertical directions and having different characteristics, using the positions MHP and MVP as parameters. The SVF 884 records the selected numbers in a memory (not shown).

For an invalid block, a filter is selected by setting the highest frequency component positions to be a DC component. Then, the low-pass filters according to the selected numbers of the filters are applied to block boundary data and data in the decoded data block input from the buffer 882 via the switch 883. In this case, different filter characteristics to be used for block boundary pixels and pixels in the block may be used.

The decoded data block subjected to the filter processing is output to the switch 885, and is then input to an adder 886 only when the valid/invalid block discrimination unit 875 discriminates a valid block. The adder 886 receives zero by controlling a switch 895 when the intra/inter-frame discrimination unit 874 selects intra-frame coding; the adder 886 receives the decoded image signal of the previous frame by controlling the switch 895 when the unit 874 selects inter-frame coding. The adder 886 adds the two input data to generate decoded image data of the currently coded image, and rewrites the contents (decoded image data of the previous frame) at the predetermined position of a frame memory 887 with the generated decoded image data. A frame memory 893 stores original image data without any modifications.

The data stored in these frame memories 887 and 893 are output via a switch 894. The switch 894 is controlled to be connected to the frame memory 893 when the valid/invalid frame discrimination unit 900 discriminates an invalid frame; the switch 894 is controlled to be connected to the frame memory 887 when the unit 900 discriminates a valid frame.

The output from the switch 894 is input to the switch 892, an ME unit 888, and an MC unit 890.

The ME unit 888 receives original image data, and decoded image data of the previous frame stored in the frame memory 887 or the input original image data of the previous frame stored in the frame memory 893 as the output from the switch 894, and performs motion detection.

The motion detection is performed for a search area within a range of ±d pixels, around the same positions as an original image data block, of decoded image data or original image data of the previous frame with respect to an n×m pixel block (e.g., 8×8 pixels) of the original image data (when this technique is used for an ultrasonic diagnostic image, a range of±d pixels in the horizontal direction is used).

The discrimination criterion of a motion vector to be obtained is a position when the difference absolute value sum between original image data and decoded image data of the previous frame is minimum, and the difference absolute value sum is smaller than (the difference absolute value sum at the position of a motion vector=0)×α. When this condition is not satisfied, a motion vector is set to "0". a is a constant. When a motion vector is to be calculated up to a position with a 1-pixel precision or less, an interpolated image at the corresponding position is generated from the decoded image data or original image data of the previous frame, and the difference absolute value sum is similarly calculated.

Furthermore, a frequency in one block line is calculated for motion vectors of each block, and a motion vector having a maximum frequency other than zero is determined to be a representative motion vector in the corresponding block line (FIGS. 20A and 20B). The representative motion vector is output to the MC unit 890 and the MPX 901. A difference absolute value sum memory 889 stores a difference absolute value sum of a motion vector=0 which is output from the ME unit 888.

Then, the block line is divided into a plurality of lines (divided into two lines for an ultrasonic diagnostic image), and motion vector frequencies are calculated in units of divided block lines. Furthermore, frequencies are re-calculated within ranges of [−Δ, Δ] and [representative motion vector−Δ, representative motion vector+Δ] with respect to the calculated frequency distribution.

In this case, Δ is a constant satisfying Δ≦|representative motion vector/2|, and [−a, b] represents a region which includes −a but excludes b.

The two frequencies in each divided block line region are represented by $H_0(n)$ and $H_{mv}(n)$ (where n is the index indicating the position of a divided block line shown in FIGS. 20A and 20B).

When these frequencies satisfy $H_0(n)<H_{mv}(n)$, motion compensation in this divided block line is permitted; otherwise, motion compensation is inhibited. This signal is output to an MC discrimination unit 891.

The MC unit 890 reads decoded image data of the previous frame in the frame memory 887 or input original image data of the previous frame in the frame memory 893 in accordance with the representative motion vector data from the ME unit 888 to generate a motion-compensated predicted image block, and outputs it to the switch 892.

Also, the MC unit 890 calculates a difference absolute value sum (MC error absolute value sum) between the original image data and the motion-compensated predicted image block, and outputs it to the MC discrimination unit 891. Furthermore, the difference absolute value sum memory 889 outputs a difference absolute value sum (0) at the same block position to the MC discrimination unit 891.

The MC discrimination unit 891 discriminates that motion compensation of a block satisfying the MC error absolute value sum<the difference absolute value sum (0)×β only when it receives a signal for permitting motion compensation in the corresponding divided block line from the ME unit 888. A signal indicating the ON/OFF state of motion compensation controls the switch 892, and is output to the filter ON/OFF discrimination unit 896 and the MPX 901. β is a constant.

The switch 892 receives the decoded image data of the previous frame in the frame memory 887 or the input original image data of the previous frame in the frame memory 893, which is output from the switch 894, and the motion-compensated predicted image data from the MC unit 890. When the MC discrimination unit 891 discriminates that motion compensation is ON, the motion-compensated predicted image data from the MC unit 890 is output to the subtracter 871 and the switch 895; when the MC discrimination unit 891 discriminates that motion compensation is OFF, the output from the switch 894 is output to the subtracter 871 and the switch 895.

The filter ON/OFF discrimination unit 896 can store the output from the MC discrimination unit 891 for several blocks. When the stored MC discrimination state of the previous block is the same as that of the current block, the unit 896 switches the switch 883 to apply a filter to the boundary between these two blocks. When the MC discrimination state of the previous block is different from that of the current block, the unit 896 switches the switch 883 not to apply a filter.

The buffer 897 stores variable length coded data for one frame, and outputs the data amount of the stored codes to the valid/invalid frame discrimination unit 900.

The MPX 901 receives the quantization scale from the rate controller 902, valid/invalid frame information from the valid/invalid frame discrimination unit 900, valid/invalid block information from the valid/invalid block discrimination unit 875, compressed data stored in the buffer 897 via the switch 898, the block line representative motion vector data from the ME unit 888, and block information with MC or without MC from the MC discrimination unit 891. The MPX 901 re-arranges these data in a predetermined bit stream, and outputs the bit stream to the transmission buffer 903 and the rate controller 902.

The bit stream stored in the transmission buffer 903 is output at a predetermined rate. The rate controller 902 counts the code amount of the bit stream as the output from the MPX 901, and predicts the quantization scale of the next frame to be coded, so that the generated code amount becomes equal to or smaller than a predetermined average bit rate. This prediction is independently performed in each of intra- and inter-frame coding modes.

Prediction formulas are as follows:

$$Q_s(I) = (\text{code amount } (I) \text{ to be assigned to next frame/generated code amount } (I) \text{ of current frame})^{1/2} \times Q_s'(I)$$

$$Q_s(P) = (\text{code amount } (P) \text{ to be assigned to next frame/generated code amount } (P) \text{ of current frame})^{1/2} \times Q_s'(P)$$

where $Q_s'$ (I) and $Q_s'$ (P) are the quantization scales respectively used in the current intra- and inter-coding frames, and $Q_s(I)$ and $Q_s(P)$ are the quantization scales to be respectively used in the next intra- and inter-coding frames.

This quantization scale is input to the quantizer 877 and the inverse quantizer 879 to generate a quantization step size used for the next frame.

Upon repetition of the above-mentioned processing for one frame, a motion image signal is compressed with high efficiency. According to this embodiment, since motion-compensated prediction between input original image data of the previous frame and input image data of the current frame is performed immediately after an invalid frame or upon execution of intra-frame coding at a predetermined time interval, the inter-frame difference absolute value sum (i.e., the motion-compensated predicted error absolute value sum) can be prevented from being increased even when an image signal has a large motion region, thus preventing appearance of an unexpected invalid frame.

Figure 24:
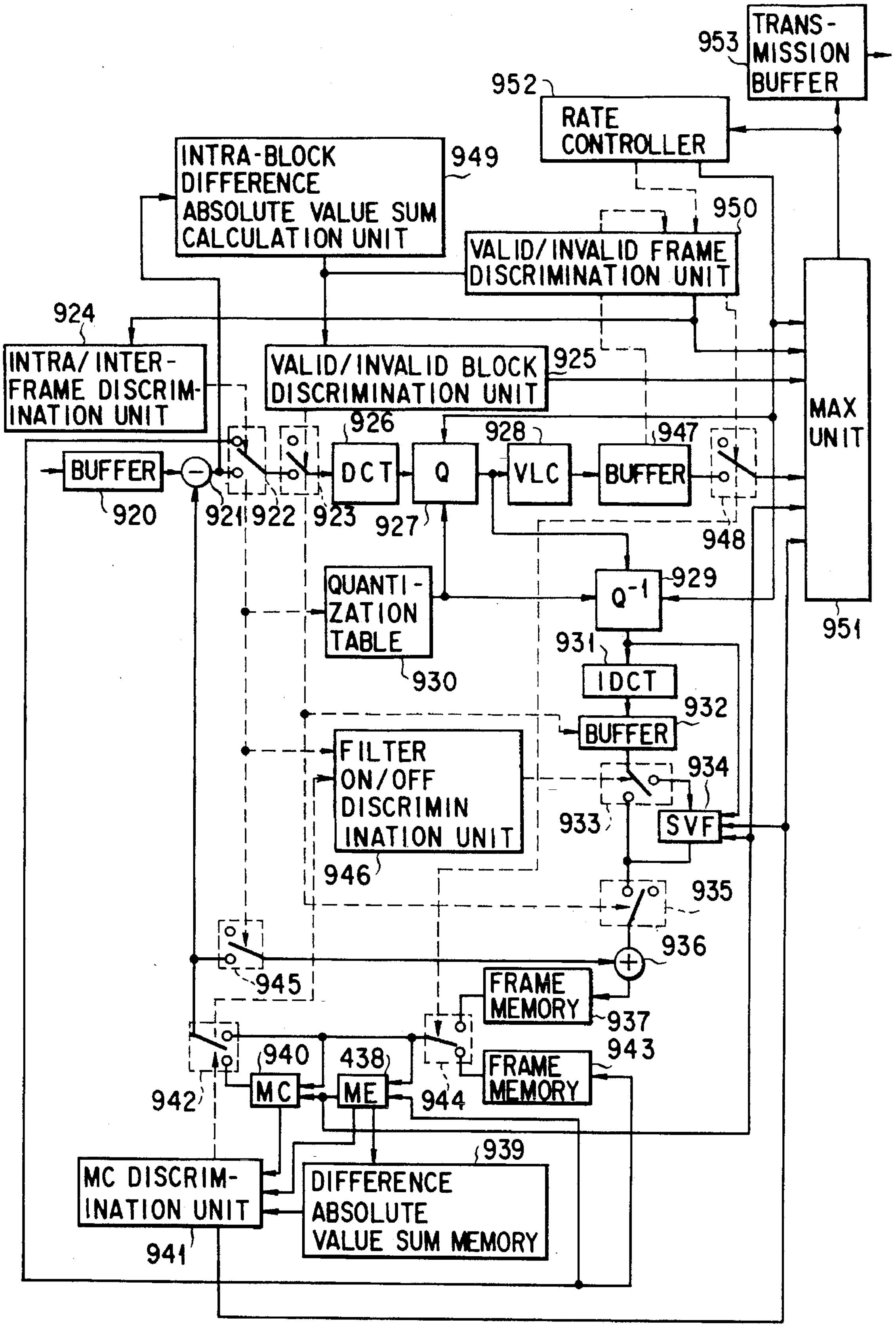
FIG. 24 is a block diagram showing a motion image coding apparatus according to the ninth embodiment of the present invention.

FIG. 24 shows the arrangement of a motion image coding apparatus according to the ninth embodiment of the present invention. Since the arrangement of the ninth embodiment is similar to that of the eighth embodiment, only characteristic feature portions will be explained below.

In this motion image coding apparatus, decoded data output from an IDCT 931 and stored in a buffer 932 is supplied to an SVF 934 via a switch 933 when a filter ON/OFF discrimination unit 946 determines a filter ON mode.

Also, the SVF 934 receives transform coefficients as the outputs from an inverse quantizer ($Q^{-1}$) 929, motion vector data as the output from an ME unit 938, and motion compensation ON/OFF information as the output from an MC discrimination unit 941.

The SVF 934 calculates non-zero highest frequencies MHP and MVP (FIG. 17) in the horizontal and vertical directions of the transform coefficients as the outputs from the inverse quantizer 929. Then, the SVF 934 selects low-pass filters to be applied to the decoded data from a plurality of low-pass filters (FIGS. 18A to 18E) using the calculated frequencies MHP and MVP as parameters. More specifically, when the frequency MHP is large (the highest frequency is high), a low-pass filter having a wide frequency range in the horizontal direction is selected. Conversely, when the MHP is small (the highest frequency is low), a low-pass filter having a narrow frequency range in the horizontal direction is selected.

As for the frequency MVP, a low-pass filter is similarly selected in the vertical direction. Furthermore, the SVF 934 discriminates based on the size of the motion vector data from the ME unit 938 if a filter having a narrower frequency range than that of the selected low-pass filter is to be selected. In this case, when the absolute value of a motion vector of a block to be motion-compensated is larger than a threshold value X, a low-pass filter having a narrower frequency range than that of the selected low-pass filter is selected (the same processing is performed in both the horizontal and vertical directions).

Thus, a distortion can be eliminated by obtaining a stricter frequency-band limitation for a block which has a large motion amount and may cause a larger coding distortion. Also, this embodiment utilizes the fact that a blur in a portion having a large motion amount is less conspicuous even if it is relatively large.

As described above, according to the motion image coding apparatus of this embodiment, when it is discriminated that a block distortion is expected to worsen upon filtering, since no filter is applied to a block boundary (block line), a generated distortion can be prevented from worsening.

Also, motion compensation for making most of block boundaries of motion-compensated predicted image data continuous is realized, the number of block boundaries to which a low-pass filter can be applied immediately after inverse orthogonal transform can be greatly increased, and a block distortion caused by coding can be eliminated.

At a block boundary motion-compensated by a large motion vector, the filter characteristics are processed in a direction to blur, thereby suppressing a distortion. If the motion amount is large, no visual problem is posed even if a blur slightly increases.

Furthermore, since motion-compensated predicted image data of original image data of the previous frame is used as reference image data used in valid/invalid frame discrimination immediately after an invalid frame, a differential error for a large motion can be reduced, and undesired discrimination of an invalid frame can be prevented.

Therefore, the motion image coding apparatus of the present invention can suppress generation of a block distortion, and can perform compression with high efficiency.

As has been described in detail above, according to the sixth to ninth embodiments of the present invention, a motion image coding apparatus which can suppress generation of a block distortion even for an image in which a block distortion conspicuously appears can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A motion image signal compression apparatus for selectively performing intra-frame coding and inter-frame coding by selectively using an image signal of a current frame, an image signal of a previous frame, and a decoded image signal of the previous frame with respect to an inputted image signal which is continuously inputted in units of frames, comprising:

inter-frame predicted error signal generation means for selectively performing a comparison between one of a) the image signal of the current frame and the decoded image signal of the previous frame and b) the image signal of the current frame and the image signal of the previous frame, and for generating an inter-frame predicted error signal representing a result of the comparison performed;

statistical amount calculation means for calculating a statistical amount of the inter-frame predicted error signal;

discrimination means for determining that the current frame of the inputted image signal is an ineffective frame when the statistical amount of the inter-frame predicted error signal is greater than a predetermined value, and for determining that the current frame of the inputted image signal is an effective frame when the statistical amount of inter-frame predicted error signal is not greater than the predetermined value; and coding means for selectively coding by high-efficiency compression one of a) the inter-frame predicted error signal so as to perform inter-frame coding when the current frame is determined by said discrimination means to be an effective frame and the current frame follows an effective previous frame and b) the image signal of the current frame so as to perform intra-frame coding when the current frame is determined by said discrimination means to be an effective frame and the current frame follows an ineffective previous frame by a predetermined interval, said coding means being set in an off state when the current frame is determined by said discrimination means to be an ineffective frame; and wherein said inter-frame predicted error signal generation means includes means for comparing the image signal of the current frame and the decoded image signal of the previous frame when the previous frame was determined by said discrimination means to have been an effective frame, and means for comparing the image signal of the current frame and the image signal of the previous frame when the previous frame was determined by said discrimination means to have been an ineffective frame.

2. The motion image signal compression apparatus according to claim 1, further comprising:

transmission buffer means for transmitting a coded output of said coding means; and wherein said discrimination means includes means for determining that the current frame is an ineffective frame when an occupation amount of said transmission buffer for storing one-frame coded data is greater than a predetermined value.

* * * * *